United States Patent
Anzai

[11] Patent Number: 5,828,818
[45] Date of Patent: *Oct. 27, 1998

[54] PRINT APPARATUS AND METHOD

[75] Inventor: Katsuhiko Anzai, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 260,963

[22] Filed: Jun. 15, 1994

[30] Foreign Application Priority Data

Jun. 16, 1993 [JP] Japan .................................. 5-168406

[51] Int. Cl.⁶ .................................................. G06K 15/00
[52] U.S. Cl. ........................................... 395/117; 395/102
[58] Field of Search ..................................... 395/102, 111, 395/117; 400/61, 62, 63, 64, 76; 355/311, 313, 314, 41, 56; 358/498, 451; 399/376, 370, 339, 82, 85, 86

[56] References Cited

U.S. PATENT DOCUMENTS

| | | | |
|---|---|---|---|
| 4,635,212 | 1/1987 | Hatazawa | 364/518 |
| 4,647,189 | 3/1987 | Fujiwara et al. | 355/55 |
| 4,964,070 | 10/1990 | Markoff et al. | 364/523 |
| 5,208,902 | 5/1993 | Kumon | 395/116 |

*Primary Examiner*—Arthur G. Evans
*Attorney, Agent, or Firm*—Fitzpatrick, Cella, Harper & Scinto

[57] ABSTRACT

A print apparatus includes a size detection unit for detecting the size of a recording medium by detecting the front and rear edges and right and left edges of an input recording medium, a correction unit for correcting the size detected by the size detection unit on the basis of a plurality of pieces of pre-stored correction information, and a control unit for controlling the page layout on the recording medium in correspondence with the size corrected by the correction unit.

32 Claims, 15 Drawing Sheets

FIG. 2

```
PAPER SIZE DETECTION
         ↓
RESET COUNTERS 9, 12 TO "0"        (1)
         ↓
FEED PAPER                          (2)
         ↓
TURN "WIDTH DETECTION" SIGNAL ON    (3)
         ↓
    ← ← ← ←
"DETECTION END" SIGNAL ON ?  —N—    (4)
         │Y
READ HOR. COUNT AND STORE IT IN RAM5 (5)
         ↓
TURN "WIDTH DETECTION" SIGNAL OFF   (6)
         ↓
TURN "PAPER FEED" SIGNAL ON         (7)
         ↓
    ← ← ← ←
"FEED END" SIGNAL ON ?  —N—         (8)
         │Y
READ VER. COUNT AND STORE IT IN RAM5 (9)
         ↓
TURN "FEED END" SIGNAL OFF          (10)
         ↓
        END
```

FIG. 3

| LENGTH | WIDTH | INDEX | FORM NAME |
|--------|-------|-------|-----------|
| 5159 | 3642 | [0] | B4 |
| 3642 | 2579 | [1] | B5 |
| 4209 | 2976 | [2] | A4 |
| 2976 | 2104 | [3] | A5 |
| 5040 | 3060 | [4] | LEGAL |
| 3960 | 3060 | [5] | LETTER |

| VERTICAL | HORIZONTAL | FORM NAME | INDEX |
|---|---|---|---|
|  |  |  | [0] |
|  |  |  | [1] |
|  |  |  | [2] |
|  |  |  | [3] |
|  |  |  | [4] |

| VERTICAL | HORIZONTAL | FORM NAME | |
|---|---|---|---|
| 2835 | 2126 | "ORG1" | [0] |
| 3060 | 2880 | "USER" | [1] |
|  |  |  | [2] |
|  |  |  | [3] |
|  |  |  | [4] |

FIG. 12

| VERTICAL | HORIZONTAL | FORM NAME | INDEX |
|---|---|---|---|
| 5159 | 3642 | "B4" | [0] |
| 3642 | 2579 | "B5" | [1] |
| 4209 | 2976 | "A4" | [2] |
| 2976 | 2104 | "A5" | [3] |

FIG. 14A

| 5 | 1 | 0 | 0 | × | 3 | 5 | 0 | 1 |   |   |   | d | o | t |

FIG. 14B

| 1 | 4 | . | 1 | 6 | × | 9 | . | 7 | 3 |   |   | i | n | c | h |

FIG. 14C

| 3 | 5 | 9 | . | 8 | × | 2 | 4 | 7 | . | 0 |   |   | m | m |

FIG. 14D

| A | 4 |   | L | A | N | D | S | C | A | P | E |   |   |   |

FIG. 14E

| B | 5 |   | P | O | R | T | R | A | I | T |   |   |   |   |

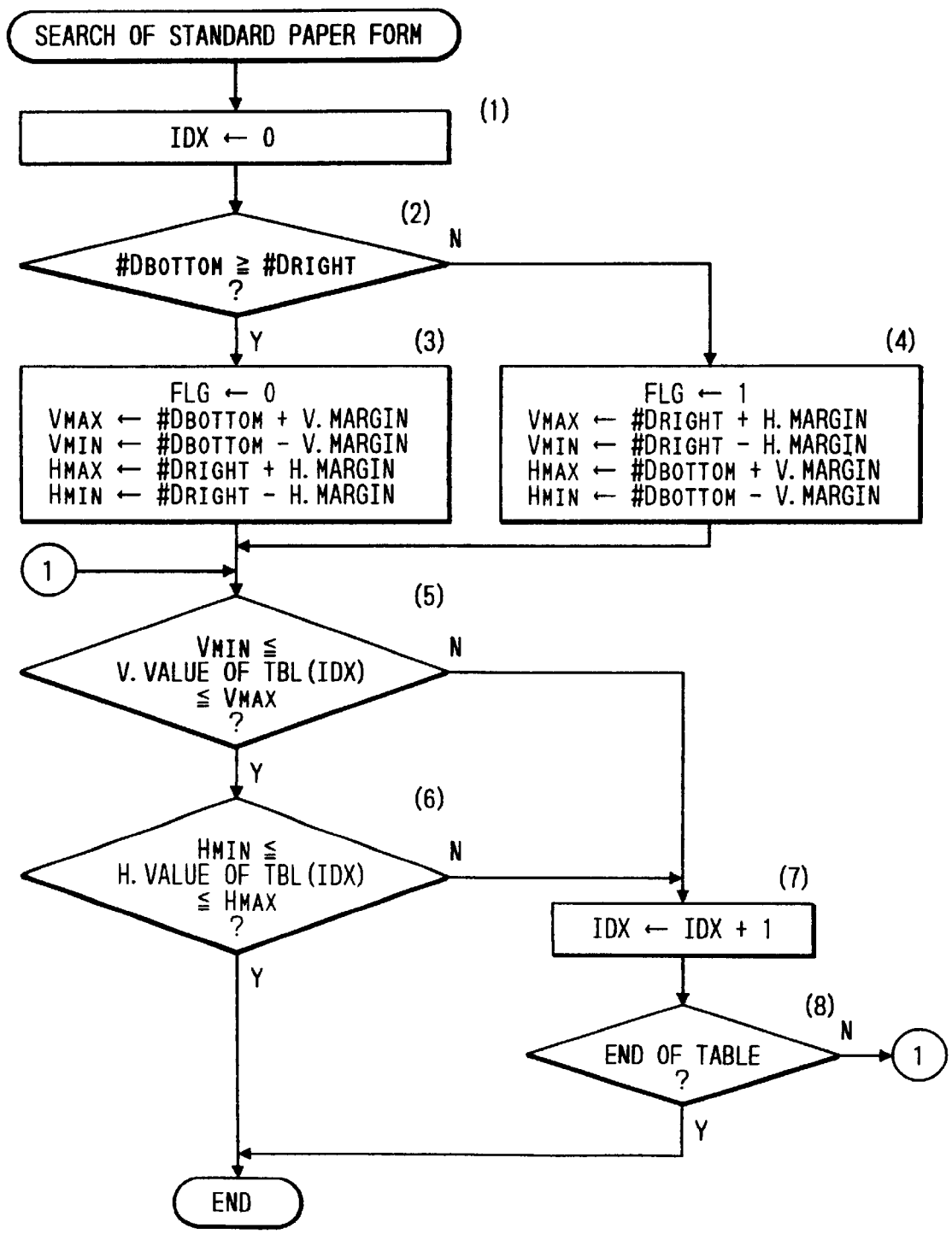

FIG. 16A
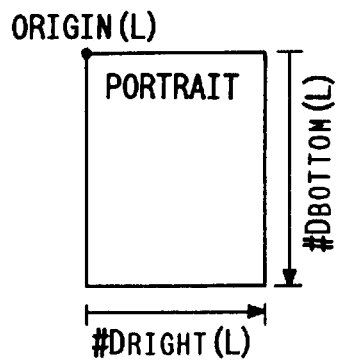
FIG. 16B
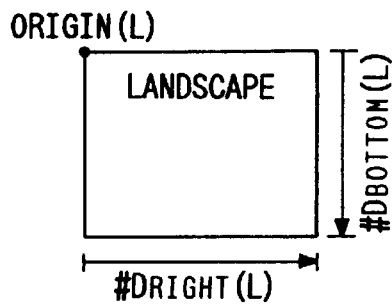
FIG. 16C
FIG. 16D
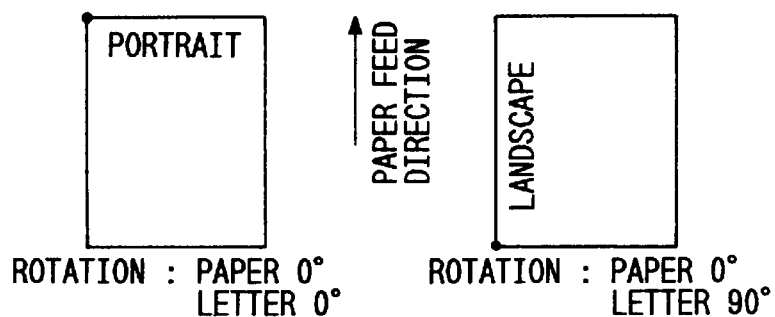
ROTATION : PAPER 0°
         LETTER 0°
ROTATION : PAPER 0°
         LETTER 90°
FIG. 16E
FIG. 16F
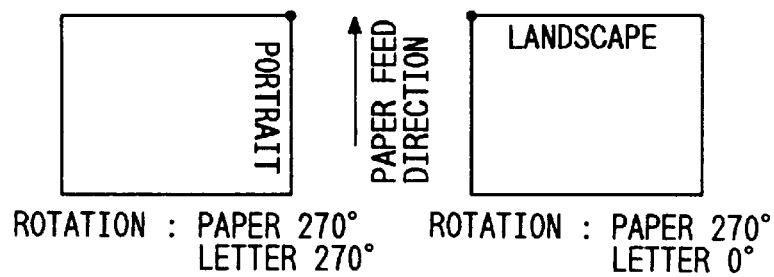
ROTATION : PAPER 270°
         LETTER 270°
ROTATION : PAPER 270°
         LETTER 0°
FIG. 16G
FIG. 16H
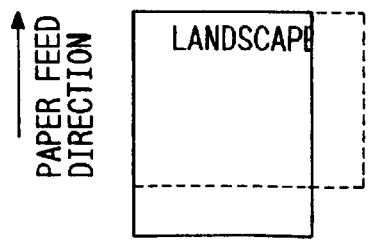

PRINT APPARATUS AND METHOD

BACKGROUND OF THE INVENTION

1. Field of the Invention

The present invention relates to a print apparatus for receiving print data from an external apparatus such as a host computer and the like, and printing received data on a recording medium such as a paper sheet and the like, and a method therefor.

2. Related Background Art

A conventional print apparatus detects the paper size by detecting three-dimensional patterns formed on cassettes in correspondence with paper sizes on the basis of a cassette type paper feed system for only specific standard paper sizes. Based on this information, a page printer formats a page. When a tray type paper feed mechanism is used or manual paper feed processing is performed, the paper size cannot be detected.

On the other hand, a paper feed mechanism in a serial printer performs only processing for detecting only the size in the widthwise direction, so that an ink or ribbon is prevented from becoming attached to a portion where no paper is present.

In the prior art, when the tray type paper feed mechanism is used, a user inputs a paper size using an operation panel or a control command to a print apparatus. However, when the input paper size does not matches that of an actually fed paper sheet, an intended print result cannot often be obtained.

SUMMARY OF THE INVENTION

The present invention has been made to eliminate the above-mentioned problems, and has as its object to provide a print apparatus, which detects the size of a cut sheet to be fed, and corrects the cut sheet size on the basis of a plurality of pieces of stored correction information or sets a registered paper size, so that an optimal page layout for the size of a cut sheet to be fed can be achieved by only setting the cut sheet at a paper feed position even when a standard sheet is fed or when a cut sheet having a size specified by a user is fed.

It is the first object of the present invention to provide a print apparatus comprising output means for determining a page layout corresponding to page information by analyzing print information input from an external apparatus, and printing information on a cut sheet, paper feed means for feeding the cut sheet, size detection means for detecting a cut sheet size by detecting the front and rear (or bottom) edges and the right and left edges of the cut sheet fed from the paper feed means, correction means for correcting the cut sheet size detected by the size detection means on the basis of a plurality of pieces of pre-stored correction information, and control means for controlling the page layout on the cut sheet by the output means in correspondence with the cut sheet size corrected by the correction means.

It is the second object of the present invention to provide a print apparatus comprising correction means for correcting the cut sheet size detected by the size detection means on the basis of pre-stored error correction information depending on the size detection means, and correction information for a standard paper size.

It is the third object of the present invention to provide a print apparatus comprising input means for inputting desired cut sheet size data indicating a size desired by a user, registered paper information storage means for storing the cut sheet size data indicating the desired size input from the input means, output means for determining a page layout corresponding to page information by analyzing print information input from an external apparatus and printing information on a cut sheet, paper feed means for feeding the cut sheet, size detection means for detecting a cut sheet size by detecting the front and rear edges and the right and left edges of the cut sheet fed from the paper feed means, correction means for correcting the cut sheet size detected by the size detection means on the basis of the cut sheet size data stored in the registered paper information storage means, and control means for controlling the page layout on the cut sheet by the output means in correspondence with the cut sheet size corrected by the correction means.

It is the fourth object of the present invention to provide a print apparatus comprising output means for determining a page layout corresponding to page information by analyzing print information input from an external apparatus, and printing information on a cut sheet, paper feed means for feeding the cut sheet, size detection means for detecting a cut sheet size by detecting the front and rear edges and the right and left edges of the cut sheet fed from the paper feed means, correction means for correcting the cut sheet size detected by the size detection means to be a standard paper size on the basis of pre-stored error correction information depending on the size detection means and correction information for the standard paper size, display means for displaying the standard paper size corrected by the correction means, standard paper size invalidating means for invalidating the standard paper size displayed on the display means, and validating a cut sheet size obtained by correcting the cut sheet size detected by the size detection means on the basis of the pre-stored error correction information depending on the size detection means, and control means for controlling the page layout on the cut sheet by the output means in correspondence with the cut sheet size corrected by the correction means or the standard paper size.

It is the fifth object of the present invention to provide a print apparatus comprising page direction designation means for designating a page layout direction from portrait and landscape directions, output means for determining a page layout corresponding to page information by analyzing print information input from an external apparatus, and printing information on a cut sheet, paper feed means for feeding the cut sheet, size detection means for detecting a cut sheet size by detecting the front and rear edges and the right and left edges of the cut sheet fed from the paper feed means, determination means for determining a direction of the cut sheet size detected by the size detection means from portrait and landscape directions, correction means for correcting the cut sheet size detected by the size detection means on the basis of a plurality of pieces of pre-stored correction information, rotation means for rotating print data output from the output means by comparing the direction of the cut sheet size determined by the determination means and the page layout direction designated state designated by the designation means, and control means for controlling the page layout of the print data, rotated by the rotation means, on the cut sheet in correspondence with the cut sheet size corrected by the correction means.

It is the sixth object of the present invention to provide a print apparatus comprising output means for determining a page layout corresponding to page information by analyzing print information input from an external apparatus, and printing information on a cut sheet, paper feed means for feeding the cut sheet, size detection means for detecting a cut sheet size by detecting the front and rear edges and the right and left edges of the cut sheet fed from the paper feed means, correction means for correcting the cut sheet size detected by the size detection means on the basis of a plurality of pieces of pre-stored correction information, and transfer means for converting the cut sheet size information corrected by the correction means into control information for the external apparatus, and transferring the converted information to the external apparatus.

It is the seventh object of the present invention to provide a print method comprising the steps of: detecting a cut sheet size by detecting the front and rear edges and the right and left edges of a fed cut sheet; correcting the detected cut sheet size on the basis of a plurality of pieces of pre-stored correction information; and controlling a page layout on the cut sheet in correspondence with the corrected cut sheet size, whereby information laid out by a user on the basis of a standard paper size can be reliably page-formatted on a cut sheet to be fed.

It is the eighth object of the present invention to provide a print method comprising the step of correcting the detected paper size on the basis of pre-stored error correction information and correction information for a standard paper size, whereby information laid out by a user on the basis of a standard paper size can be reliably page-formatted on a cut sheet to be fed even when the detected size suffers an error.

It is the ninth object of the present invention to provide a print method comprising the steps of: detecting a cut sheet size by detecting the front and rear edges and the right and left edges of a fed cut sheet; correcting the detected cut sheet size on the basis of stored cut sheet size data; and controlling a page layout on the cut sheet in correspondence with the corrected cut sheet size, whereby even when a cut sheet having a size approximate to a standard paper size is fed, information can be reliably page-formatted on a cut sheet having a desired size, which is registered and used by a user.

It is the tenth object of the present invention to provide a print method comprising the steps of: correcting a detected cut sheet size to a standard paper size on the basis of pre-stored error correction information and correction information for the standard paper size; displaying the corrected standard paper size; invalidating the displayed standard paper size, and validating a cut sheet size obtained by correcting the detected cut sheet size on the basis of the pre-stored error correction information; and controlling a page layout on the cut sheet in correspondence with the corrected cut sheet size or the standard paper size, whereby a user can confirm that a cut sheet having a size approximate to the detected paper size is fed and its paper size is corrected to the standard paper size, and can select the standard paper size or the cut sheet size.

It is the eleventh object of the present invention to provide a print method comprising the steps of: detecting a cut sheet size by detecting the front and rear edges and the right and left edges of a fed cut sheet; correcting the detected cut sheet size on the basis of a plurality of pieces of pre-stored correction information; rotating print data to be output by comparing the determined direction of the cut sheet size, and a designated page layout direction; and controlling a page layout of the rotated print data on the cut sheet in correspondence with the corrected cut sheet size, whereby even when the page layout direction of a cut sheet designated by a user is different from the direction of the cut sheet, a print output matching the page layout direction designated by the user can be obtained.

It is the twelfth object of the present invention to provide a print method comprising the steps of: detecting a cut sheet size by detecting the front and rear edges and the right and left edges of a fed cut sheet; correcting the detected cut sheet size on the basis of a plurality of pieces of pre-stored correction information; and converting the corrected cut sheet size information into control information for an external apparatus, and transferring the converted information to the external apparatus, whereby a program of the external apparatus recognizes a page format corresponding to a cut sheet of a print apparatus, and allows selection of the size of a cut sheet to be fed in addition to paper sizes registered in the program.

BRIEF DESCRIPTION OF THE DRAWINGS

FIG. 2 is a flow chart showing an example of a paper size detection processing sequence in the print apparatus according to the first embodiment of the present invention;

FIG. 3 is a view showing an example of a standard paper form information table stored in a ROM shown in FIG. 1, and used for searching of a standard paper form;

FIG. 12 is a view showing an example of a standard paper form information table used for searching of a standard paper form in the print apparatus according to the fourth embodiment of the present invention;

FIG. 13 is a flow chart showing an example of a standard paper form search processing sequence in the print apparatus according to the fourth embodiment of the present invention;

FIGS. 14A to 14E are views showing examples of paper information display states on a liquid crystal display unit of an operation panel shown in FIG. 11;

FIGS. 16A to 16H are views for explaining layout determination processing in a print apparatus according to the fifth embodiment of the present invention;

DETAILED DESCRIPTION OF THE PREFERRED EMBODIMENTS

[First Embodiment]

In this embodiment, the present invention is applied to a thermal jet printer as a serial printer. The thermal jet printer used in this embodiment has, as its standard or conventional functions, a paper edge detection mechanism, and a sensor for the widthwise direction to prevent ink ejection onto a portion where no paper sheet is present. The print area format is controlled based on the outputs from these sensors.

Figure 1:
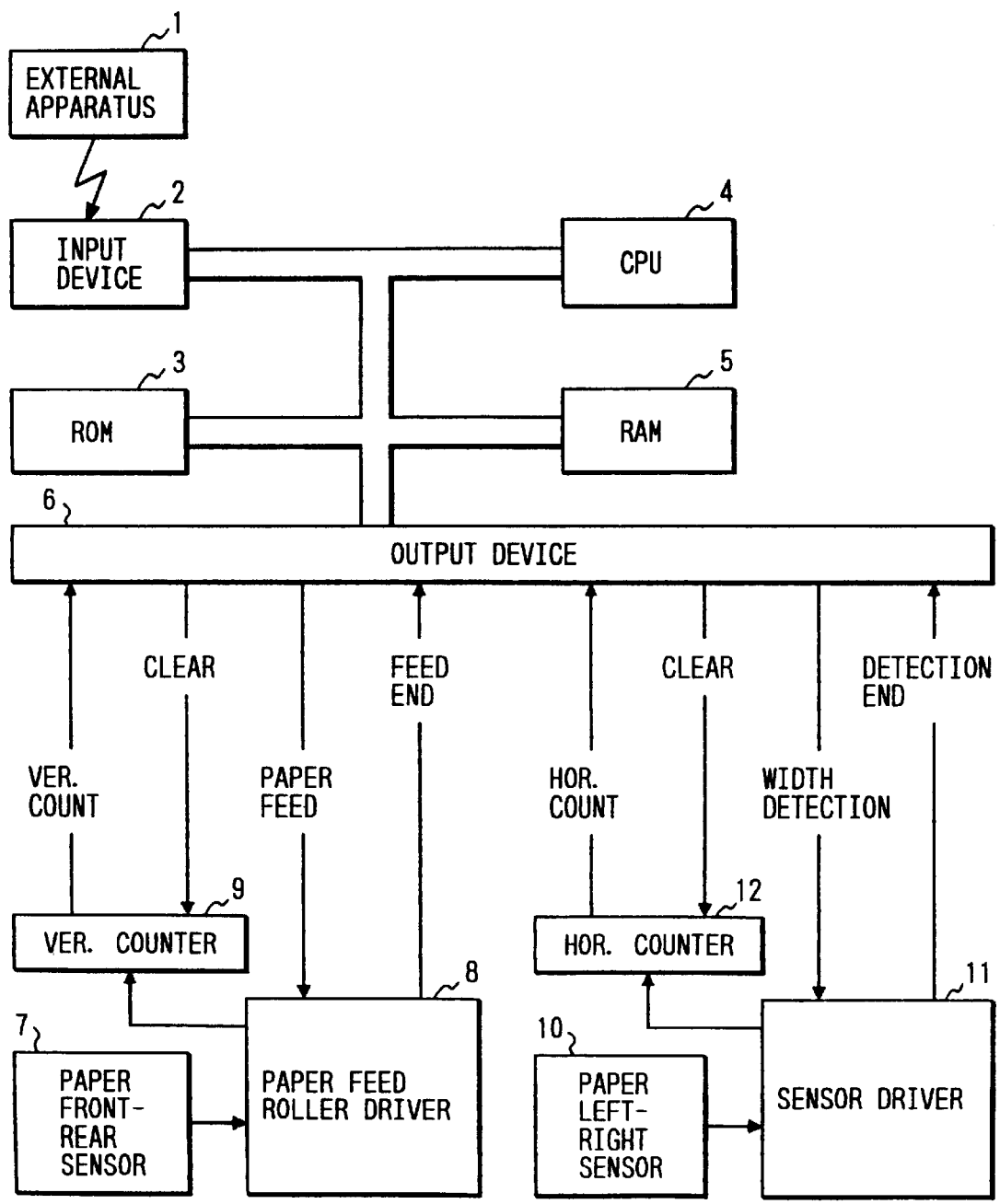
FIG. 1 is a block diagram for explaining the control arrangement of a print apparatus according to the first embodiment of the present invention.

FIG. 1 is a block diagram for explaining the control arrangement of a print apparatus according to the first embodiment of the present invention.

Referring to FIG. 1, an external apparatus 1 such as a host computer supplies data to the print apparatus, and executes an application software program, and the like.

An input device 2 receives data supplied to the print apparatus. A ROM 3 stores a control program and various kinds of information. The ROM 3 also pre-stores information such as vertical and horizontal correction coefficients, and the like.

A CPU 4 executes the control program stored in the ROM 3. The main function of the CPU 4 is to format a page by analyzing print data and a control command received by the input device 2 in accordance with the control program, and performing actual development processing. The CPU 4 also performs control management of the entire apparatus.

A RAM 5 stores print data processed by the CPU 4, and is used as a frame memory for developing bit map data. In addition, variables for holding horizontal and vertical counter values, and the like are also stored in the RAM 5.

An output device 6 prints bit map image data developed on the RAM 5 onto, e.g., a paper sheet. The output device 6 performs paper feed processing of a paper sheet, and print processing. A paper front-rear sensor 7 has an output unit which is turned on upon detection of the front edge of a fed paper sheet, and is turned off upon detection of the rear edge of the paper sheet. Therefore, while the sheet front-rear sensor 7 is ON, it indicates that the paper sheet is passing on the sensor.

A paper feed roller driver 8 has a function of driving a paper feed roller in units of steps, and outputting a specific number of pulses per step. Note that the pulses are output only while the output from the paper front-rear sensor 7 connected to the paper feed roller driver 8 is ON. The paper feed roller driver 8 starts a paper feed operation in response to a paper feed signal, and outputs a paper feed end signal upon completion of the paper feed operation.

A vertical counter 9 counts the paper feed pulses from the paper feed roller driver 8 used for the paper feed operation so as to check the paper size in the paper feed direction. The vertical counter 9 is designed to receive count and clear inputs for the counter, and to allow the count value to be read out therefrom.

A paper left-right sensor 10 is designed to keep outputting a signal indicating an ON state while detecting the presence of a paper sheet by scanning the widthwise direction of a print area. A paper left-right sensor driver 11 moves the paper left-right sensor 10 to scan the widthwise direction of the entire print area. The paper left-right sensor driver 11 has a function of driving the paper left-right sensor 10 in units of steps, and outputting a specific number of pulses per step. The paper left-right sensor driver 11 also has a function of starting the scanning operation in the widthwise direction in response to a width detection signal, and outputting a width detection end signal when it has driven the paper left-right sensor 10 to a maximum scanning point. In this case, when the output from the paper left-right sensor 10 is turned from on to off before the sensor 10 reaches the maximum scanning point, the driver 11 outputs the width detection end signal without waiting for detection of the maximum scanning point.

A horizontal counter 12 counts horizontal movement pulses output from the paper left-right sensor driver 11 upon movement of the paper left-right sensor 10 so as to detect the horizontal width of a paper sheet. The horizontal counter 12 is designed to receive count and clear inputs for the counter, and to allow the counter value to be read out therefrom.

In a first print apparatus with the above-mentioned arrangement, the front and rear edges and the right and left edges of a cut sheet fed from a paper feed means (for feeding a cut sheet from a tray or a manually inserted sheet upon driving of the paper feed roller driver 8) are detected by a size detection means (the paper front-rear sensor 7 and the paper left-right sensor 10) so as to detect the cut sheet size. The detected cut sheet size is corrected by a control means (the CPU 4) on the basis of a plurality of pieces of pre-stored correction information (stored in the ROM 3), and a control means (the CPU 4) controls the page layout on the cut sheet by an output means (the output device 6) in correspondence with the corrected cut sheet size. For this reason, information laid out by a user based on a standard paper form can be reliably page-formatted on a cut sheet to be fed.

In a second print apparatus with the arrangement shown in FIG. 1, the correction means corrects the cut sheet size detected by the size detection means on the basis of error correction information depending on the size detection means and correction information for a standard paper size. For this reason, even when the size detected by the size detection means suffers an error, information laid out by a user based on a standard paper form can be reliably page-formatted on a cut sheet to be fed.

Note that arrows in FIG. 1 indicate signal lines, and the CPU 4 can control the states of the signal lines via the output device 6.

A paper size detection start instruction is input by a user by operating a panel (not shown) attached to the print apparatus or by inputting a control command to the print apparatus. The paper size detection processing operation in the print apparatus according to the first embodiment of the present invention will be described below with reference to the flow chart shown in FIG. 2.

FIG. 2 is a flow chart showing an example of a paper size detection processing sequence in the print apparatus according to the first embodiment of the present invention. Note that (1) to (10) represent step numbers, and the CPU 4 reads out this sequence from the ROM 3 and executes it.

The vertical counter 9 is reset to "0" in response to a vertical counter zero clear signal, and the vertical counter 12 is reset to "0" in response to a horizontal counter zero clear signal (1). The CPU 4 supplies a paper feed instruction to the output device 6 to feed a paper sheet to an existing paper feed means (2). With this paper feed processing, the paper sheet is pulled in to some extent, and allows detection in the horizontal direction. When the width detection signal to be output from the output device 6 is turned on (3), the paper left-right sensor driver 11 drives the paper left-right sensor 10 to scan it on the paper sheet. When the paper left-right sensor 10 has reached the leftmost edge of a paper sheet, its output is turned on, and thereafter, the driver 11 outputs horizontal movement pulses required for scanning the paper left-right sensor 10 to the horizontal counter 12. The horizontal counter 12 counts these pulses.

While the paper left-right sensor driver 11 scans the paper left-right sensor 10 up to the rightmost edge of a print area, when the paper left-right sensor 10 detects the rightmost edge of the paper sheet and turns off its output, the paper left-right sensor driver 11 stops supply of pulses to the horizontal counter 12, and outputs a width detection end signal to the output device 6.

The CPU 4 waits until the width detection end signal is turned on (4). When the CPU 4 recognizes that the width detection end signal is turned on, it reads the counter value of the horizontal counter 12, and stores the read value in the RAM 5 (5). Upon reading the value of the horizontal counter 12, the CPU 4 turns off the width detection signal (6). In response to this signal, the paper left-right sensor driver 11 turns off the width detection end signal, and returns the paper left-right sensor 10 to the home position. The CPU 4 then turns on a paper feed signal (7), and the paper feed roller driver 8 drives a paper feed roller (not shown) in units of steps, thus starting the feed operation of the paper sheet. When the fed paper sheet passes on the paper front-rear sensor 7, the paper front-rear sensor 7 is turned on, and in response to this ON signal, the paper feed roller driver 8 outputs subsequent drive pulses of the paper feed roller to the vertical counter 9. When the paper feed operation is further continued, the paper front-rear sensor 7 detects the rear edge of the paper sheet, and turns off its output. Then, the paper feed roller driver 8 stops supply of drive pulses to the vertical counter 9, and outputs a paper feed end signal.

The CPU 4 waits until the paper feed end signal is turned on (8). Upon recognizing that the paper feed end signal is turned on, the CPU 4 reads the counter value of the vertical counter 9 and stores the read counter value in the RAM 5 (9). When the CPU 4 turns off the paper feed signal (10), the paper feed roller driver 8 turns off the paper feed end signal, thus ending paper size detection processing.

Since the thermal jet printer used in this embodiment does not require any thermal fixing process unlike in an electrophotography system, almost no load is imposed by the paper feed operation of a paper sheet, and the paper sheet used in size detection can be fed again. For this reason, a user can return the used paper sheet to the tray, thus preventing waste of paper sheets.

Variables used in a page layout by the CPU 4 in correspondence with the paper size will be explained below.

Upon execution of a page layout, the CPU 4 defines the left top end as an origin of a paper size; the number of dots to the right edge of a paper sheet as the number of dots at paper right edge; and the number of dots to the bottom edge of the paper sheet as the number of dots at paper bottom edge, and stores these numbers of dots in the RAM 5 as variables. The CPU 4 has a function of laying out a page, so that a control command and print data input from the input device 2 fall within a range defined by these variables. Normally, the numbers of dots at paper right and bottom edges are initialized with reference to a table stored in the ROM 3, which table stores predetermined numbers of dots corresponding to useable standard paper forms. Alternatively, when a paper size to be used is designated by using a control command, the numbers of dots at paper right and bottom edges are determined.

In this embodiment, the CPU 4 can use an actual paper size obtained by the above-mentioned temporary paper feed operation. If the paper feed roller driver 8 and the paper left-right sensor driver 11 can output pulses which can be directly used by the CPU 4, no correction processing is required. In this embodiment, however, a case will be described below wherein correction processing is assumed to be performed under the conditions that the CPU 4 executes control based on the resolution (e.g., 360 dots/inch (DPI)) of the output device 6, the paper left-right sensor driver 11 of the output device 6 outputs 720 pulses/inch, and the paper feed roller driver 8 also outputs 720 pulses/inch.

Under the above-mentioned conditions, in order to correct this number of pulses to 360 DPI as the resolution of the output device 6, the vertical and horizontal correction coefficients are set to be 0.5, and this information is pre-stored in the ROM 3. The CPU 4 calculates the numbers of dots at paper right and bottom edges as size information necessary for laying out a page on the basis of the stored information. The CPU 4 reads out the vertical and horizontal correction coefficients from the ROM 3, and performs the following correction calculations using the horizontal and vertical counter values in the RAM 5:

No. of Dots at Paper Right Edge=Horizontal Counter Value×Horizontal Correction Coefficient No. of Dots at Paper Bottom Edge=Vertical Counter Value×Vertical Correction Coefficient Thereafter, the CPU 4 performs a page layout using the calculated numbers of dots at paper right and bottom edges. At this time, when a standard paper form search instruction is input from the operation panel (not shown) or by a control command, the CPU 4 further executes standard paper form search processing based on the paper size information. This processing is performed to correct the following error. That is, an error occurs in paper size information due to mechanical and optical errors of paper size detection, and the size detection result is different from that expected by a user although he or she sets a standard paper sheet. For this purpose, the detected size information is pre-stored in the ROM 3 to have detection errors in respective directions as margins. The margins require four values, i.e., positive and negative values in the vertical direction, and positive and negative values in the horizontal direction. In this embodiment, two, i.e., positive and negative margin values having the same absolute value are used for each of the vertical and horizontal directions, and these values are based on a unit system used by the CPU 4.

FIG. 3 shows an example of a standard paper form information table stored in the ROM 3 shown in FIG. 3.

As shown in FIG. 3, pairs of numerical values, i.e., pairs of lengths and widths of standard paper forms are arranged in correspondence with the number of standard paper forms to be supported, and length information and width information of a specific standard paper form can be read out by designating an index. The standard paper form search processing operation in the print apparatus according to the first embodiment of the present invention will be described below with reference to the flow chart shown in FIG. 4.

Figure 4:
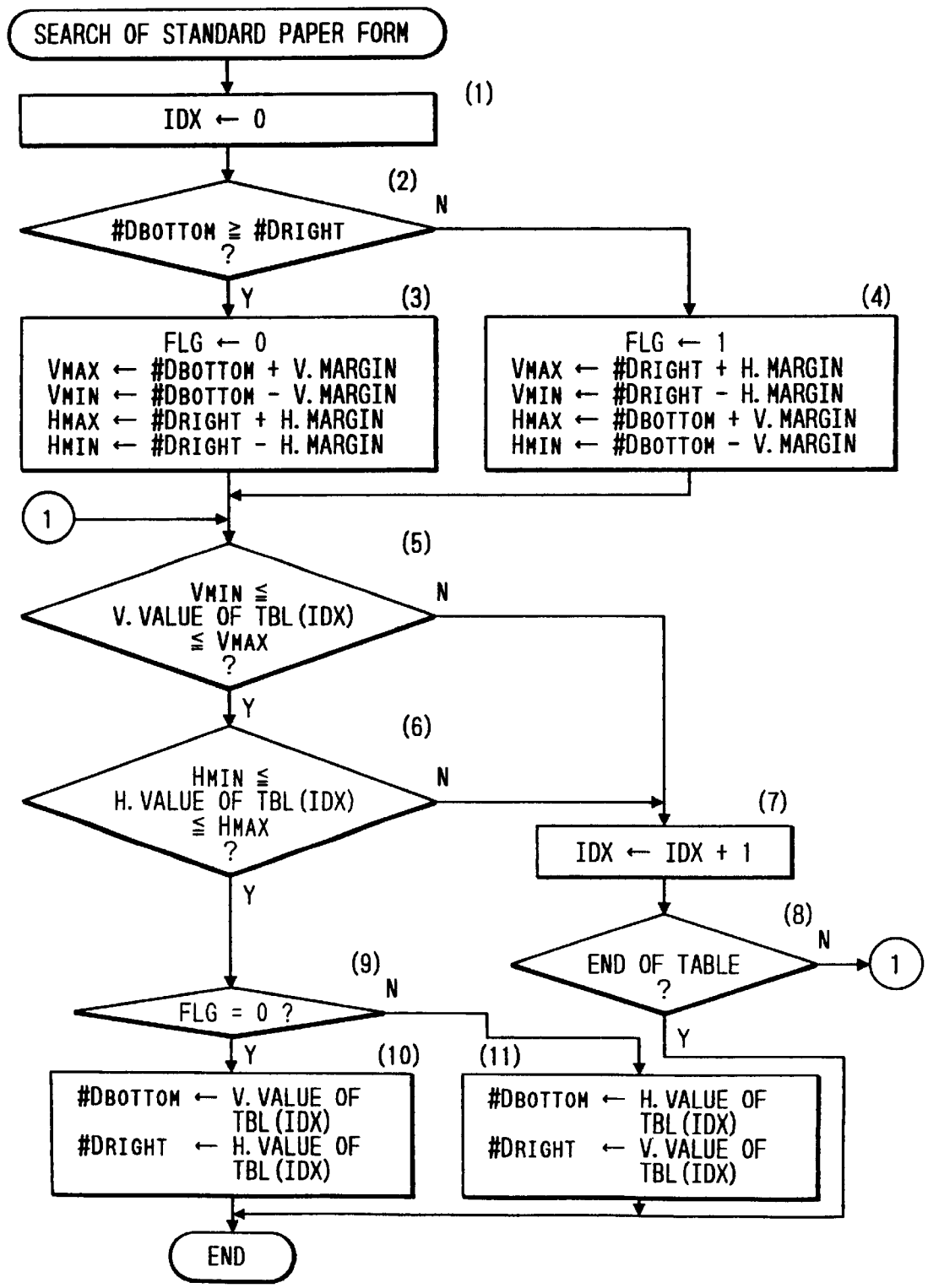
FIG. 4 is a flow chart showing an example of a standard paper form search processing sequence in the print apparatus according to the first embodiment of the present invention.

FIG. 4 is a flow chart showing an example of the standard paper form search processing sequence in the print apparatus according to the first embodiment of the present invention. Note that (1) to (11) represent steps.

A variable idx indicating an index number of the standard paper form information table is set to be "0" (1). The number of dots at paper bottom edge (#$D_{BOTTOM}$) and the number of dots at paper right edge (#$D_{RIGHT}$) are compared with each other (2), and the flow branches in correspondence with the standard paper form information table depending on the direction of a paper sheet.

If it is determined as a result of comparison in step (2) that #$D_{BOTTOM}$>#$D_{RIGHT}$, a status flag flg is set to be "0". Then, in consideration of the vertical and horizontal margins, (#$D_{BOTTOM}$+vertical margin) is set in a vertical maximum value ($V_{MAX}$), (#$D_{BOTTOM}$−vertical margin) is set in a vertical minimum value ($V_{MIN}$), (#$D_{RIGHT}$+horizontal margin) is set in a horizontal maximum value ($H_{MAX}$), and (#$D_{RIGHT}$−horizontal margin) is set in a horizontal minimum value ($H_{MIN}$) (3). In this manner, a detection size range considering an error range can be obtained.

On the other hand, if it is determined as a result of comparison in step (2) that #$D_{BOTTOM}$<#$D_{RIGHT}$, the status flag flg is set to be "1". In this case, since the vertical and horizontal directions replace each other, (#$D_{RIGHT}$+ horizontal margin) is set in $V_{MAX}$, (#$D_{RIGHT}$−horizontal margin) is set in $V_{MIN}$, (#$D_{BOTTOM}$+vertical margin) is set in $H_{MAX}$, and (#$D_{BOTTOM}$−vertical margin) is set in $H_{MIN}$ (4). Thereafter, the flow advances to step (5) and subsequent steps. In this manner, a detection size range is obtained. With this processing, the following search processing can be commonly executed.

In order to check the vertical direction, the length value of the standard paper form information table indicated by the value of the variable idx is read out, and it is checked if the length value of the standard paper form information table (variable (index) idx) satisfies a condition that it is equal to or larger than $V_{MIN}$ obtained in step (3) or (4), and is equal to or smaller than $V_{MAX}$ (5) similarly obtained in step (3) or (4). If it is determined in step (5) that the condition is satisfied, the width value of the standard paper form information table indicated by the value of the variable idx is similarly read out as in the vertical direction in order to check the horizontal direction. It is then checked if the width value of the standard paper form information table (variable (index) idx) satisfies a condition that it is equal to or larger than $H_{MIN}$ obtained in step (3) or (4), and is equal to or smaller than $H_{MAX}$ (6) obtained in step (3) or (4). If it is determined in step (6) that the condition is satisfied, it is determined that the paper size of interest is the standard paper form indicated by the value of the variable idx. If the condition in the vertical or horizontal direction is not satisfied (7), the value of the variable idx is incremented by "1". At this time, it is checked if the value of the variable idx exceeds the range of the standard paper form information table (end of table) (8). If it is determined in step (8) that the value of the variable idx does not exceed the range of the standard paper form information table, the flow returns to step (5) to search the next standard paper form information, thus continuing the search processing.

On the other hand, if it is determined in step (8) that the value of the variable idx exceeds the range of the standard paper form information table, since the paper size of interest coincides with none of the standard paper forms to be supported, the search processing ends, and #$D_{BOTTOM}$ and #$D_{RIGHT}$ are processed as a non-standard paper form without executing any correction.

On the other hand, if YES is determined in step (6), it is checked if the status flag flg is "0" (9). If YES in step (9), it is determined that a paper sheet is set to have its longitudinal direction parallel to the paper feed direction. Then, the length value of the standard paper form information table indicated by the variable idx is set in #$D_{BOTTOM}$, and the width value of the standard paper form information table indicated by the variable idx is set in #$D_{RIGHT}$ (10), thus ending the standard paper form search processing based on the standard paper form information table and the margin values. In this manner, the detection results in the respective directions are corrected to the standard paper form information.

On the other hand, if it is determined that the status flag flg is "1", it is determined that a paper sheet is set to have its longitudinal direction perpendicular to the paper feed direction. Then, the width value of the standard paper form information table indicated by the variable idx is set in #$D_{BOTTOM}$, and the length value of the standard paper form information table indicated by the variable idx is set in #$D_{RIGHT}$ (11), thus ending the standard paper form search processing based on the standard paper form information table and the margin values. In this manner, the detection results in the respective directions are corrected to the standard paper form information.

In this embodiment, the standard paper form information table and margin values for correcting detection errors are pre-stored in the ROM 3. Alternatively, such information may be stored in the RAM 5, and may be set by a user using a panel or control command (neither are shown), as will be described in embodiments to be described later. In this case, the CPU 4 performs information setting processing on the RAM 5, needless to say.

[Second Embodiment]

Figures 5A, 5B, 6:
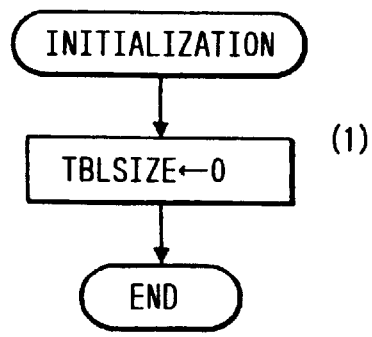
FIGS. 5A and 5B are views showing an example of a standard paper form information table allocated on a RAM shown in FIG. 1, and used for searching of a standard paper form.
FIG. 6 is a flow chart showing an example of a processing sequence for initializing a registered paper information table used for searching of a registered form in a print apparatus according to the second embodiment of the present invention.

FIGS. 5A and 5B show an example of a registered form information table which is allocated on the RAM 5 shown in FIG. 1, and is used for searching of a registered form. FIG. 5A corresponds to a non-registered state, and FIG. 5B corresponds to a registered state.

As shown in FIG. 5A, in this embodiment, pairs of numerical values (lengths and widths) are held in correspondence with registered forms. This table has a data structure which allows assignment of names to registered forms, and table areas are assured in correspondence with the registerable number of forms (in this embodiment, five forms).

From this table, the length information, width information, and form name of a specific registered form can be read out by designating an index.

Furthermore, a user registers paper size information in the table using an operation panel or a control command (neither are shown).

In this embodiment, information is registered in this table using a control command having especially the following format.

<Paper Size Registration Command>
paper size registration command: format {dc} <vertical size>; <horizontal size>p <form name>{st}

With this control command, a paper size can be designated by the vertical size (longitudinal direction) and the horizontal size (widthwise direction) of a paper sheet, and the form name can be assigned. A unit system at this time may be designated by another control command. However, in this embodiment, the sizes are designated in units of ¹⁄₁₀₀ mm.

For example, when {dc} <2000>; <1500>p <ORG1>{st}, and {dc}<2540>; <2032>p <USER> {st} are input by the control command, corresponding data are set in the table, as shown in FIG. 5B. Note that numerical values in the table are those obtained by converting the numerical value data designated by the control command on the basis of the resolution (360 DPI) used by the CPU 4.

The registration processing operation of the registered form information table used for searching of a registered form in the print apparatus according to the second embodiment of the present invention will be described below with reference to FIGS. 6 and 7.

FIG. 6 is a flow chart showing an example of an initialization processing sequence of the registered form information table used for searching of a registered form in the print apparatus according to the second embodiment of the present invention. Note that (1) represents a step.

As initialization processing upon startup of the print apparatus, a variable tblsize is initialized to "0" (1). Note that the variable tblsize indicates the number of forms registered in the table. When the control command is interpreted in practice, the sequence shown in the flow chart in FIG. 7 is started on the basis of existing control command interpretation.

Figure 7:
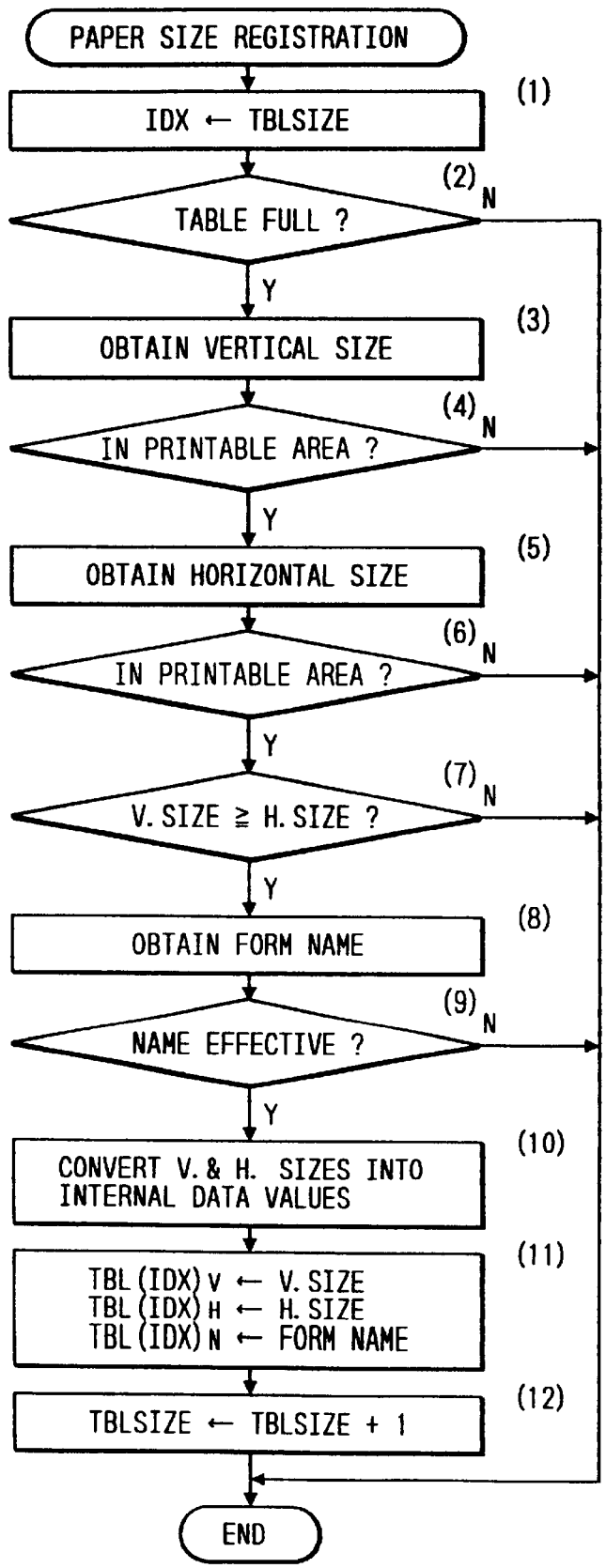
FIG. 7 is a flow chart showing an example of a processing sequence for registering the registered paper information table used for searching of a registered form in the print apparatus according to the second embodiment of the present invention.

FIG. 7 is a flow chart showing an example of a registration processing sequence of the registered form information table used for searching of a registered form in the print apparatus according to the second embodiment of the present invention. Note that (1) to (12) represent steps.

As an index number to be registered of the registered form information table, the value of the variable tblsize is substituted in the variable idx (1). Then, the variable idx is checked, and if it is determined that the registered form information table is already full of data, the control command is invalidated. It is then checked if the registered form information table has an empty area (2). If NO in step (2), the processing ends; otherwise, the vertical size of a paper sheet is obtained (3). It is checked if the obtained size falls within a range defined by the maximum and minimum sizes in the vertical direction of a paper size which can be fed and printed by the print apparatus to be used (4). If it is determined in step (4) that the obtained size falls outside the range, the processing ends.

On the other hand, if it is determined in step (4) that the paper size is effective, the horizontal size of the paper sheet is obtained (5). It is checked if the obtained size falls within a range defined by the maximum and minimum sizes in the horizontal direction of a paper size which can be fed and printed by the print apparatus to be used (6). If it is determined in step (6) that the size falls outside the range, the command is invalidated, and the processing ends.

On the other hand, if YES in step (6), i.e., if it is determined that the horizontal size is also effective, the vertical and horizontal sizes are compared with each other to check if the vertical size is larger than the horizontal size (7). This is to correctly set the length and width of registered paper size information.

If NO in step (7), the processing ends; otherwise, i.e., if the size information satisfies all the conditions, a form name is obtained (8). It is then checked if the obtained form name does not include invalid characters and has a correct name length (9). If it is determined in step (9) that the obtained name is invalid, processing ends; otherwise, the vertical and horizontal sizes are converted into values in 360 DPI for internal processing (10). Then, the vertical size is set in a length value TBL[IDX]$_v$ indicated by the variable idx as an index of the registered form information table, the horizontal size is set in a width value TBL[IDX]H indicated by the variable idx as an index of the registered form information table, and the form name is set in a name TBL[IDX]$_N$ in the registered form information table (11). Then, as an index to be registered upon execution of the next paper size registration command, the variable tblsize is incremented by "1" (12), and the processing ends.

In this manner, information is set in the registered form information table shown in FIG. 5B.

A registered form search processing operation in the print apparatus according to the second embodiment of the present invention will be described below with reference to the flow chart in FIG. 8.

Figure 8:
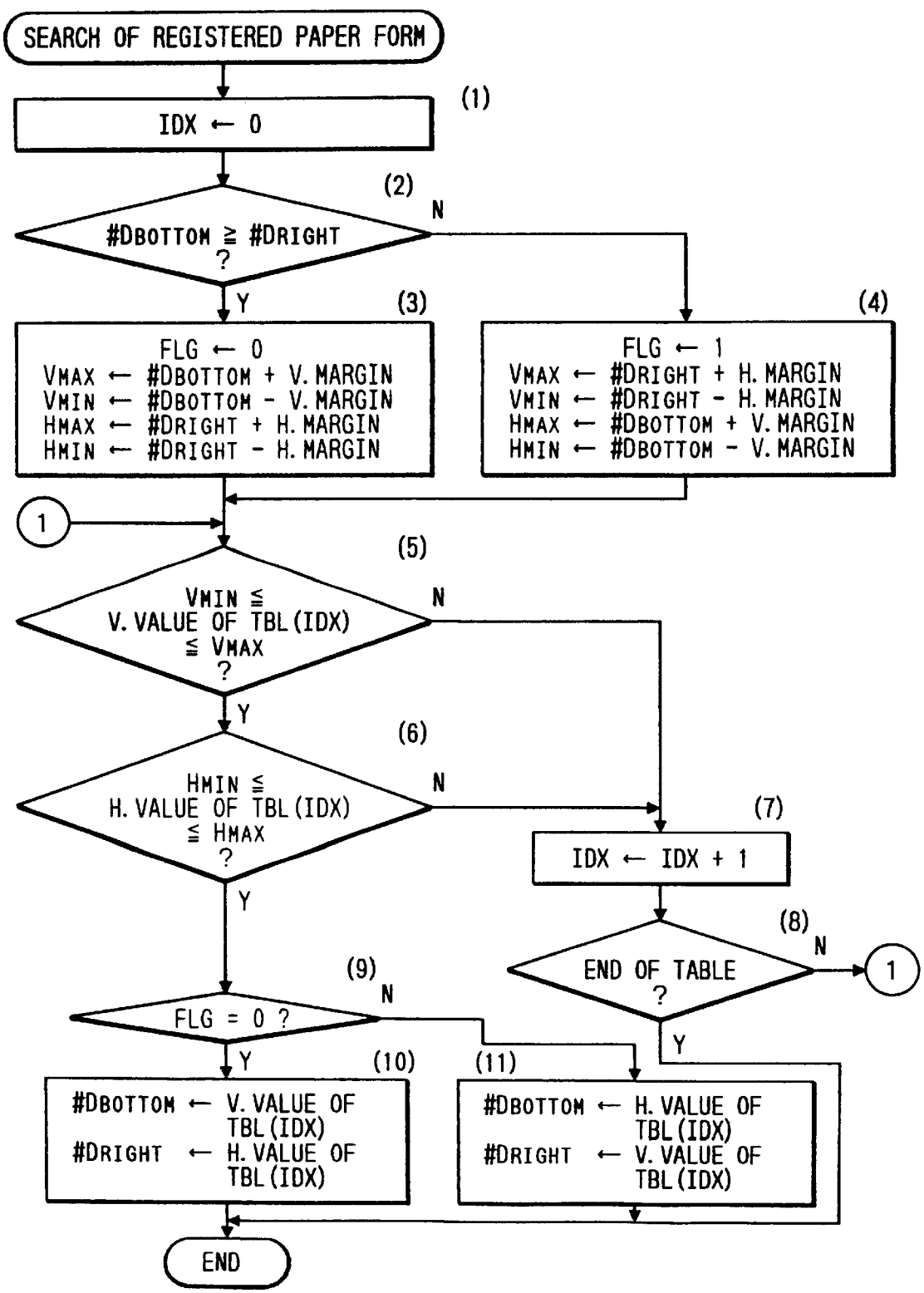
FIG. 8 is a flow chart showing an example of a processing sequence for searching of a registered form in the print apparatus according to the second embodiment of the present invention.

FIG. 8 is a flow chart showing an example of a registered form search processing sequence in the print apparatus according to the second embodiment of the present invention. Note that (1) to (11) represent steps.

The variable idx indicating an index number of the registered form information table is set to be "0" (1). Then, the number of dots at paper bottom edge (#D$_{BOTTOM}$) and the number of dots at paper right edge (#D$_{RIGHT}$) are compared with each other (2), and the flow branches in correspondence with the registered form information table depending on the direction of a paper sheet. If it is determined as a result of comparison that #D$_{BOTTOM}$>#D$_{RIGHT}$, a status flag flg is set to be "0". Then, in consideration of the vertical and horizontal margins, (#D$_{BOTTOM}$+vertical margin) is set in a vertical maximum value (V$_{MAX}$), (#D$_{BOTTOM}$−vertical margin) is set in a vertical minimum value (V$_{MIN}$), (#D$_{RIGHT}$+horizontal margin) is set in a horizontal maximum value (H$_{MAX}$), and (#D$_{RIGHT}$−horizontal margin) is set in a horizontal minimum value (H$_{MIN}$) (3). In this manner, a detection size range considering an error range can be obtained.

Similarly, if #D$_{BOTTOM}$<#D$_{RIGHT}$, the status flag flg is set to be "1". In this case, since the vertical and horizontal directions replace each other, (#D$_{RIGHT}$+horizontal margin) is set in V$_{MAX}$, (#D$_{RIGHT}$−horizontal margin) is set in V$_{MIN}$, (#D$_{BOTTOM}$+vertical margin) is set in H$_{MAX}$, and (#D$_{BOTTOM}$−vertical margin) is set in H$_{MIN}$ (4), thus obtaining a detection size range in consideration of an error range. With this processing, the following search processing can be commonly executed.

Then, the vertical direction is checked. The length value indicated by the value of the variable idx as the index of the registered form information table is read out, and it is checked if the readout value is equal to or larger than V$_{MIN}$ and is equal to or smaller than V$_{MAX}$ (V$_{MIN}$≦the length value in the registered form information table <idx>≦V$_{MAX}$) (5). If this condition is satisfied, the horizontal direction is checked. More specifically, the width value indicated by the value of the variable idx as the index of the registered form information table is read out, and it is checked if the readout value is equal to or larger than H$_{MIN}$ and is equal to or smaller than H$_{MAX}$ (H$_{MIN}$≦the width value in the registered form information table <idx>≦H$_{MAX}$) (6). If the condition is satisfied, it is determined that the paper sheet of interest is the registered form indicated by the variable idx. If the condition in the vertical or horizontal direction is not satisfied, the flow advances to step (7) to increment the value of the variable idx by "1". At this time, it is checked if the variable idx exceeds the range of the registered form information table (8). If the variable idx does not exceed the range, the flow returns to step (5) to search the next registered form information, thus continuing the search processing.

On the other hand, if it is determined in step (8) that the variable idx exceeds the range of the registered form information table, since the paper sheet of interest coincides with none of the registered forms, the search processing ends, and #D$_{BOTTOM}$ and #D$_{RIGHT}$ are processed as a non-registered form without executing any correction.

On the other hand, if it is determined in step (6) that the condition in the horizontal direction is also satisfied, it is checked if the status flag flg is "0" (9). If YES in step (9), it is determined that a paper sheet is set to have its longitudinal direction parallel to the paper feed direction. Then, the length value of the registered form information table indicated by the variable idx is set in #D$_{BOTTOM}$, and the width value of the registered form information table indicated by the variable idx is set in #D$_{RIGHT}$ (10), thus ending the registered form search processing based on the registered form information table and the margin values. In this manner, the detection results in the respective directions are corrected to the registered form information.

On the other hand, if it is determined in step (9) that the status flag flg is "1", it is determined that a paper sheet is set have its longitudinal direction perpendicular to the paper feed direction. Then, the width value of the registered form information table indicated by the variable idx is set in #D$_{BOTTOM}$, and the length value of the registered form information table indicated by the variable idx is set in #D$_{RIGHT}$ (11), thus ending the registered form search processing based on the registered form information table and the margin values. In this manner, the detection results in the respective directions are corrected to the registered form information.

In this manner, in a second print apparatus with the same arrangement as that in the print apparatus shown in FIG. 1, a size detection means (the paper front-rear sensor 7 and the paper left-right sensor 10) detects the cut sheet size by detecting the front and rear edges and the right and left edges of a cut sheet fed from a paper feed means (for feeding the cut sheet upon driving of the paper feed roller driver 8), and a correction means (the CPU 4) corrects the detected cut sheet size on the basis of cut sheet size data stored in the registered form information storage means (the RAM 5). A control means (the CPU 4) then controls the page layout on the cut sheet by an output means (the output device 6) in correspondence with the corrected cut sheet size. For this reason, even when a cut sheet having a size approximate to a standard paper size is fed, information can be reliably page-formatted on a cut sheet having a registered size to be used by a user.

In the above embodiment, margin values for correcting detection errors are held in advance in the ROM 3. However, such information may be stored in the RAM 5, and may be set by a user using a panel or a control command (neither are shown). In this case, the CPU 4 sets such information on the RAM 5.

In the above description, the registered form information table stores only values designated by a user. Alternatively, processing for registering standard paper form information, and the like upon initialization may be added.

[Third Embodiment]

In each of the above embodiments, paper size detection processing is executed by utilizing standard-equipped sensors of the thermal jet printer. Alternatively, as shown in FIG. 9, the paper size detection processing may be similarly executed using only a paper left-right sensor which can be scanned in the horizontal direction.

Figure 9:
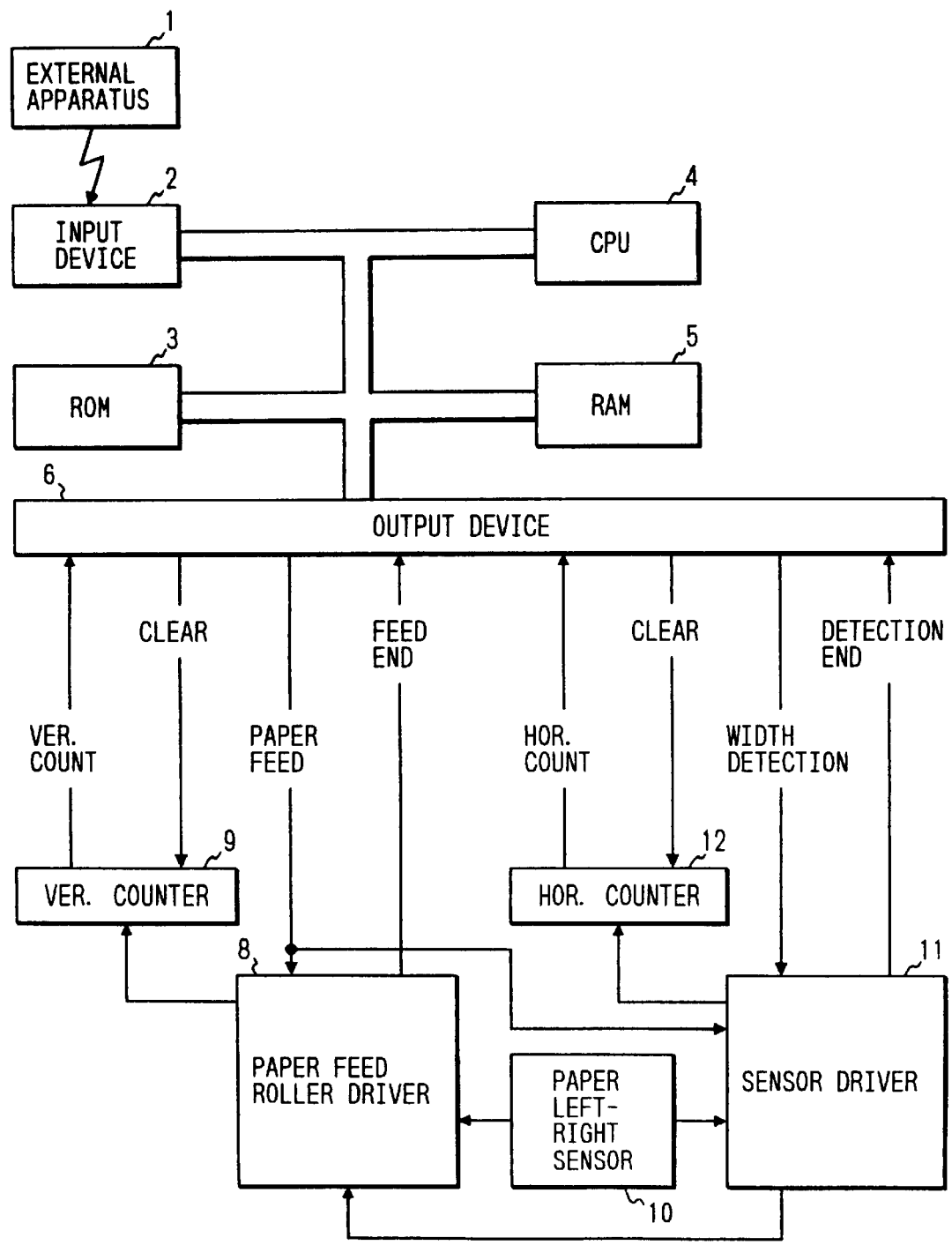
FIG. 9 is a block diagram for explaining the arrangement of a print apparatus according to the third embodiment of the present invention.

FIG. 9 is a block diagram for explaining the arrangement of a print apparatus according to the third embodiment of the present invention, and the same reference numerals in FIG. 9 denote the same parts as in FIG. 1.

As shown in FIG. 9, the paper feed roller driver 8 receives a paper feed enable signal from the paper left-right sensor driver 11, and does not start paper feed processing until the paper feed enable signal is turned on, even when a paper feed signal is ON.

When the paper left-right sensor driver 11 newly receives a paper feed signal from the output device 6, it outputs a paper feed enable signal to the paper feed roller driver 8. When the paper feed signal and a width detection signal are simultaneously turned on, the paper left-right sensor driver 11 moves the paper left-right sensor 10 to the paper front-rear sensor position described in the above embodiment so as to use the paper left-right sensor 10 in place of a paper front-rear sensor. At this time, in order to prevent a paper feed operation while the paper left-right sensor 10 is moved to the predetermined position, the paper feed enable signal is set in a disabled state. The paper feed enable signal is enabled when the paper left-right sensor 10 reaches the predetermined position. While the width detection signal is OFF to execute a normal paper feed operation, the paper feed enable signal is set in an enabled state. A paper size detection processing operation in the print apparatus according to the third embodiment of the present invention will be described below with reference to the flow chart in FIG. 10.

Figure 10:
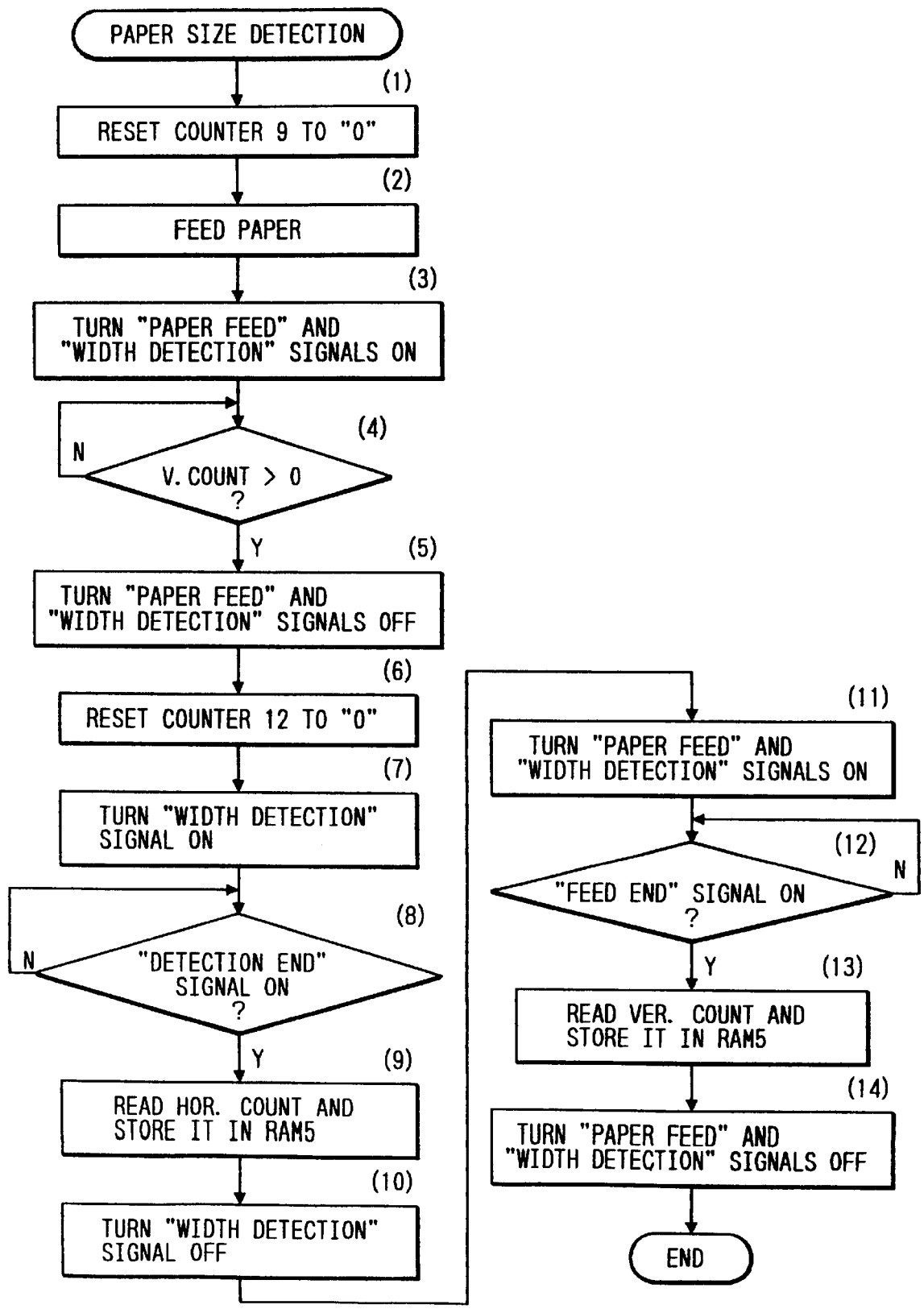
FIG. 10 is a flow chart showing an example of a paper size detection processing sequence in the print apparatus according to the third embodiment of the present invention.

FIG. 10 is a flow chart showing an example of a paper size detection processing sequence in the print apparatus according to the third embodiment of the present invention. Note that (1) to (14) represent steps.

The vertical counter 9 is reset to "0" using a vertical counter zero clear signal (1). Then, a paper sheet is fed by the conventional paper feed means (2). By turning on the paper feed signal and the width detection signal (3), the paper left-right sensor driver 11 disables the paper feed enable signal, moves the paper left-right sensor 10 to the paper front-rear sensor position, and thereafter, sets a paper feed enabled state, as described above. At this time, the paper feed roller driver 8 starts the paper feed operation when the paper feed signal is ON, and the paper feed enable signal from the paper left-right sensor driver 11 is set in an enabled state.

The CPU 4 monitors the value of the vertical counter. When the value of the vertical counter exceeds "0" (4), the CPU 4 temporarily turns off the paper feed signal and the width detection signal (5). With this operation, the paper left-right sensor driver 11 moves the paper left-right sensor 10 to the home position, and the paper feed roller driver 8 stops the paper feed operation. The vertical counter 9 is not cleared and holds the current value. At this time, since the paper sheet is present immediately below the paper left-right sensor 10, it can be sensed in the horizontal direction.

Then, the horizontal counter 12 is reset to "0" using a horizontal counter zero clear signal (6).

By turning on only the width detection signal (7), the paper left-right sensor driver 11 drives the paper left-right sensor 10 to scan it on the paper sheet. When the paper left-right sensor 10 has reached the leftmost edge of the paper sheet, the output from the paper left-right sensor 10 is turned on, and thereafter, the driver 11 outputs horizontal movement pulses necessary for scanning the paper left-right sensor 10 to the horizontal counter 12. The horizontal counter 12 counts these pulses. While the paper left-right sensor driver 11 scans the paper left-right sensor 10 to the rightmost edge of a print area, when the paper left-right sensor 10 detects the rightmost edge of the paper sheet and turns off its output, the paper left-right sensor driver 11 stops supply of pulses to the horizontal counter 12, and then outputs a width detection end signal. The CPU 4 waits until the width detection end signal is turned on (8). When the CPU 4 recognizes that the width detection end signal is ON, it reads the counter value of the horizontal counter 12 and stores the read counter value in the RAM 5 (9). Since the CPU 4 turns off the width detection signal (10), the paper left-right sensor driver 11 moves the paper left-right sensor 10 to the home position, and turns off the width detection end signal.

In order to detect the rear edge of the paper sheet, the CPU 4 turns on the paper feed signal and the width detection signal again (11). In response to these signals, the paper left-right sensor driver 11 moves the paper left-right sensor 10 to the paper front-rear sensor position, and enables the paper feed enable signal while the paper left-right sensor 10 is kept ON. The paper feed roller driver 8 drives a paper feed roller (not shown) in units of steps, thus re-starting the paper feed operation. Since the re-fed paper sheet is passing on the paper left-right sensor 10, the output from the sensor 10 is kept ON, and in response to this output signal, the paper feed roller driver 8 outputs paper feed roller drive pulses to the vertical counter 9. When the paper feed operation is continued, and the paper left-right sensor 10 detects the rear edge of the paper sheet and turns off its output, the paper feed roller driver 8 stops supply of drive pulses to the vertical counter, and outputs a paper feed end signal.

On the other hand, the CPU 4 waits until the paper feed end signal is turned on (12). When the CPU 4 recognizes that the paper feed end signal is ON, it reads the counter value of the vertical counter 9, and stores the read counter value in the RAM 5 (13). When the CPU 4 turns off the paper feed signal and the width detection signal (14), the paper left-right sensor driver 11 moves the paper left-right sensor 10 to the home position, and the paper feed roller driver 8 turns off the paper feed end signal. Thus, the paper size detection processing in the output device 6 ends. Since the subsequent paper size correction processing and the like are the same as those in the above embodiments, a detailed description thereof will be omitted.

[Fourth Embodiment]

Figure 11:
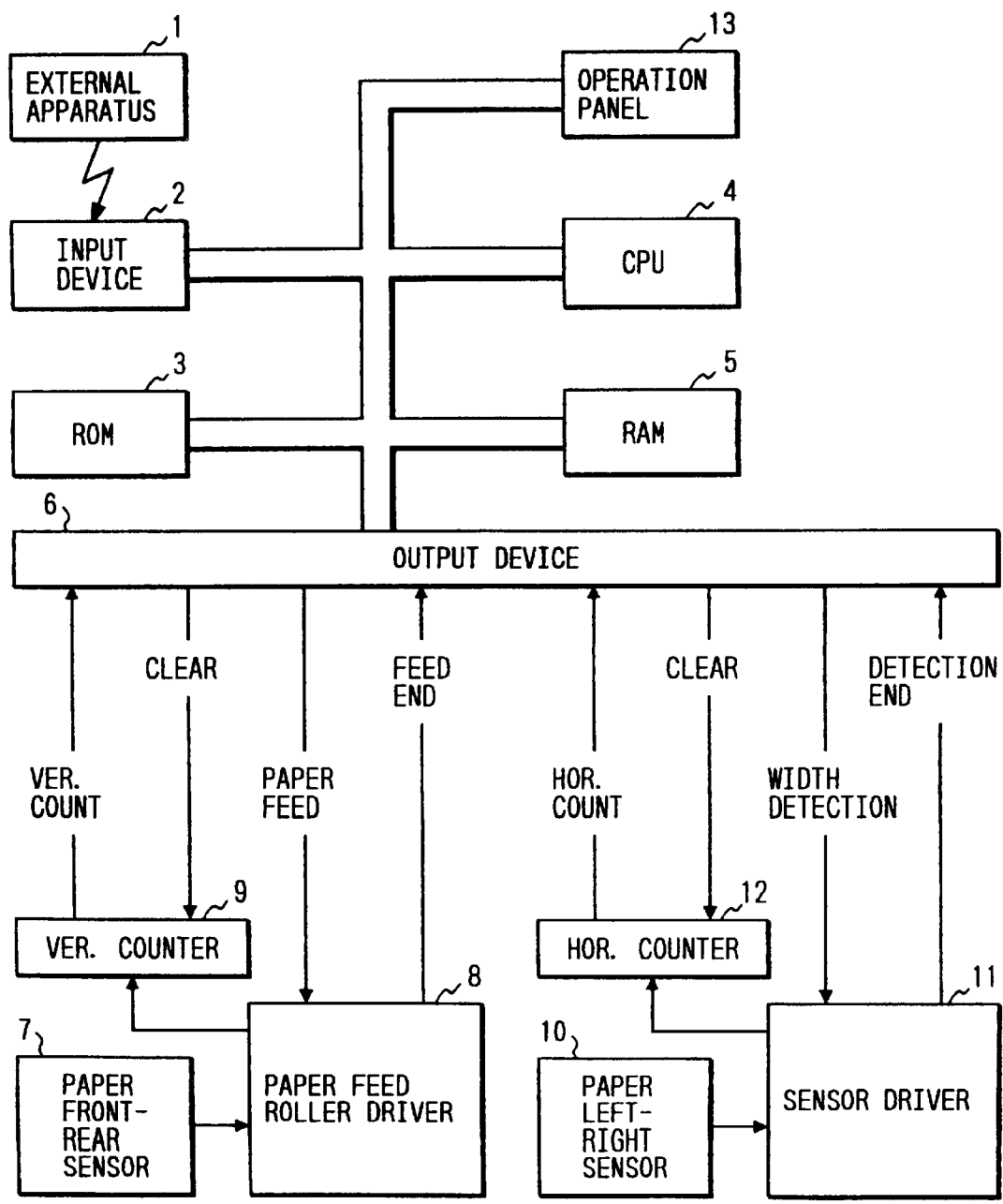
FIG. 11 is a block diagram for explaining the control arrangement of a print apparatus according to the fourth embodiment of the present invention.

FIG. 11 is a block diagram for explaining the control arrangement of a print apparatus according to the fourth embodiment of the present invention, and the same reference numerals in FIG. 11 denote the same parts as in FIG. 1.

Referring to FIG. 11, an operation panel 13 is used as a user interface, and consists of a liquid crystal display unit and switches (neither are shown). The operation panel 13 displays a message to a user, and inputs an instruction from a user to the print apparatus.

In a fourth print apparatus with the above arrangement, a correction means (the CPU 4) corrects the cut sheet size detected by a size detection means (the paper front-rear sensor 7 and the paper left-right sensor 10) to a standard paper size on the basis of pre-stored error correction information depending on the size detection means and correction information for the standard paper size. The corrected standard paper size is displayed on a display means (the operation panel 13). When the displayed standard paper size is invalidated, and a standard paper size invalidating means (the switch on the operation panel 13) validates a cut sheet size obtained by correcting the cut sheet size detected by the size detection means on the basis of the pre-stored error correction information (the ROM 3) depending on the size detection means, a control means (the CPU 4) controls the page layout on the cut sheet by an output means in accordance with the cut sheet size corrected by the correction means or the standard paper size. For this reason, a user can confirm that a cut sheet having a size approximate to that of the cut sheet detected by the detection means is fed, and its size is corrected to the standard paper size, and can select one of the standard paper size and the cut sheet size.

FIG. 12 shows an example of a standard paper form information table used for searching of a standard paper form in the print apparatus according to the fourth embodiment of the present invention. For example, this table is allocated on the ROM 3 shown in FIG. 3.

As shown in FIG. 12, the table has a data structure for storing two numerical values (the length and width) and a form name for each standard paper form, and stores these data in correspondence with the number of standard paper forms to be supported (in this embodiment, four forms, i.e., B4, B5, A4, and A5).

A standard paper form search processing operation in the print apparatus according to the fourth embodiment of the present invention will be described below with reference to the flow chart in FIG. 13.

FIG. 13 is a flow chart showing a standard paper form search processing sequence in the print apparatus according to the fourth embodiment of the present invention. Note that (1) to (8) represent steps.

A variable idx indicating an index number of the standard paper form information table is set to be "0" (1). Then, the numbers of dots at paper bottom and right edges ($\#D_{BOTTOM}$ and $\#D_{RIGHT}$) are compared with each other (2), and the flow branches in correspondence with the standard paper form information table depending on the direction of a paper sheet.

If it is determined as a result of comparison that $\#D_{BOTTOM} > \#D_{RIGHT}$, a status flag flg is set to be "0". Then, in consideration of the vertical and horizontal margins, ($\#D_{BOTTOM}$+vertical margin) is set in a vertical maximum value ($V_{MAX}$), ($\#D_{BOTTOM}$−vertical margin) is set in a vertical minimum value ($V_{MIN}$), ($\#D_{RIGHT}$+horizontal margin) is set in a horizontal maximum value ($H_{MAX}$), and ($\#D_{RIGHT}$−horizontal margin) is set in a horizontal minimum value ($H_{MIN}$) (3). In this manner, a detection size range considering an error range can be obtained.

On the other hand, if it is determined as a result of comparison in step (2) that $\#D_{BOTTOM} < \#D_{RIGHT}$, the status flag flg is set to be "1". In this case, since the vertical and horizontal directions replace each other, ($\#D_{RIGHT}$+horizontal margin) is set in $V_{MAX}$, ($\#D_{RIGHT}$−horizontal margin) is set in $V_{MIN}$, ($\#D_{BOTTOM}$+vertical margin) is set in $H_{MAX}$, and ($\#D_{BOTTOM}$−vertical margin) is set in $H_{MIN}$ (4). Thereafter, the flow advances to step (5) and subsequent steps. In this manner, a detection size range is obtained. With this processing, the following search processing can be commonly executed.

In order to check the vertical direction, the length value of the standard paper form information table indicated by the value of the variable idx is read out, and it is checked if the length value of the standard paper form information table (variable (index) idx) satisfies a condition that it is equal to or larger than $V_{MIN}$ obtained in step (3) or (4), and is equal to or smaller than $V_{MAX}$ (5) obtained in step (3) or (4). If it is determined in step (5) that the condition is satisfied, the width value of the standard paper form information table indicated by the value of the variable idx is similarly read out as in the vertical direction in order to check the horizontal direction. It is then checked if the width value of the standard paper form information table (variable (index) idx) satisfies a condition that it is equal to or larger than $H_{MIN}$ obtained in step (3) or (4), and is equal to or smaller than $H_{MAX}$ (6) obtained in step (3) or (4). If it is determined in step (6) that the condition is satisfied, it is determined that a paper size of interest is the standard paper form indicated by the value of the variable idx. If the condition in the vertical or horizontal direction is not satisfied, the value of the variable idx is incremented by "1" (7). At this time, it is checked if the value of the variable idx exceeds the range of the standard paper form information table (end of table) (8). If it is determined in step (8) that the value of the variable idx does not exceed the range of the standard paper form information table, the flow returns to step (5) to search the next standard paper form information, thus continuing the search processing.

On the other hand, if it is determined in step (8) that the value of the variable idx exceeds the range of the standard paper form information table, since the paper size of interest coincides with none of the standard paper forms to be supported, the search processing ends, and the detected size is processed as a non-standard paper form. At this time, the variable idx has a value equal to the table size ("4" in this embodiment). In this manner, the standard paper form search processing ends. Effective variables at this time are four variables, i.e., idx, flag flg, #$D_{BOTTOM}$, and #$D_{RIGHT}$.

Processing for displaying information associated with the detected paper sheet on the liquid crystal display unit arranged on the operation panel 13, and urging a user to confirm the detected information will be described below. Note that confirmation processing of this embodiment is executed only when it is determined that the detected paper size coincides with a standard paper form.

FIGS. 14A to 14E are views showing examples of paper information display states on the liquid crystal display unit of the operation panel 13 shown in FIG. 11. FIG. 14A corresponds to a state wherein the paper size is displayed in the number of dots in correspondence with the processing resolution of the CPU 4, FIG. 14B corresponds to a state wherein the detected paper size is displayed in inches, FIG. 14C corresponds to a state wherein the detected paper size is displayed in mm, and each of FIGS. 14D and 14E corresponds to a state wherein the detected paper size coincides with a registered standard paper size, and a form name in the standard paper form information table (see FIG. 12) and the direction of the paper sheet on the tray are displayed. In this embodiment, the size unit can be independently designated. However, this is not particularly important, and display control may be made to display sizes in all the units in turn.

A display determination processing operation in the print apparatus according to the fourth embodiment of the present invention will be described below with reference to the flow chart in FIG. 15.

Figure 15:
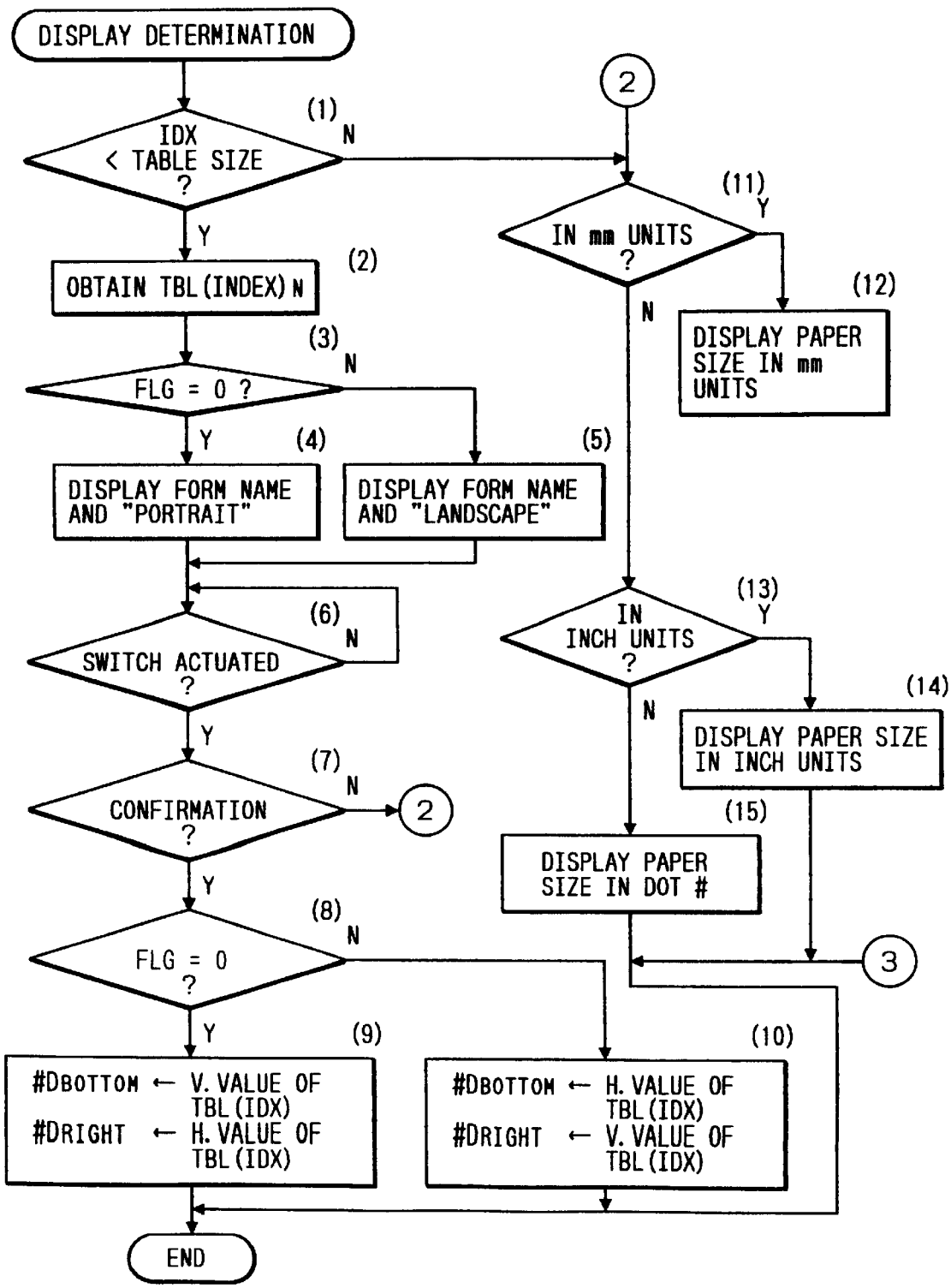
FIG. 15 is a flow chart showing an example of a display determination processing sequence in the print apparatus according to the fourth embodiment of the present invention.

FIG. 15 is a flow chart showing an example of a display determination processing sequence in the print apparatus according to the fourth embodiment of the present invention. Note that (1) to (15) represent steps.

It is checked if the value of the variable idx falls within a range of index values of the standard paper form information table (1). If YES in step (1), a form name (TBL [IDX]N) indicated by the index idx of the standard paper form information table is obtained (2). It is then checked if the value of the flag flg is "0" (3). If YES in step (3), since #$D_{BOTTOM}$ is larger than #$D_{RIGHT}$, as set in step (3) in FIG. 13, the direction of a paper sheet of interest is determined to be a "portrait" direction, and the form name and "POR-TRAIT" are displayed on the liquid crystal display unit on the operation panel 13, as shown in FIG. 14E (4). If the flag flg is "1", since #$D_{BOTTOM}$ is smaller than #$D_{RIGHT}$, the direction of the paper sheet of interest is determined to be a "landscape" direction, and the form name and "LAND-SCAPE" are displayed on the liquid crystal display unit on the operation panel 13, as shown in FIG. 14D (5). Then, a user confirms the displayed information. The CPU 4 waits until the switch on the operation panel 13 is actuated (6). When the switch is actuated, it is checked if the actuated switch is a confirmation switch indicating confirmation (7). In this case, a certain switch on the operation panel 13 is defined in advance as the confirmation switch. When this switch is actuated while the form name and the direction of the paper sheet are displayed, the CPU 4 determines that the user confirms the information; when a switch other than the confirmation switch is actuated, the standard paper form search processing result is invalidated.

If it is determined in step (7) that the actuated switch is the confirmation switch, it is checked if the value of the flag flg is "0" (8). If the flag flg is "0", since the paper sheet is set to have its longitudinal direction parallel to the paper feed direction, the length value indicated by the index idx in the standard paper form information table is set in #$D_{BOTTOM}$, and the width value indicated by the index idx in the standard paper form information table is set in #$D_{RIGHT}$ (9), thus ending processing. In this manner, the detection results in the respective directions are corrected to the standard paper form information.

On the other hand, if it is determined in step (8) that the flag flg is "1", since the paper sheet is set to have its longitudinal direction perpendicular to the paper feed direction, the width value indicated by the index idx in the standard paper form information table is set in #$D_{BOTTOM}$, and the length value indicated by the index idx in the standard paper form information table is set in #$D_{RIGHT}$ (10), thus ending processing. In this manner, the detection results in the respective directions are corrected to the standard paper form information.

On the other hand, if it is determined in step (7) that a switch other than the confirmation switch is actuated, since a non-standard paper form used by the user is approximate to the standard paper size, and is determined to be a standard paper form, processing for invalidating this result is executed. At this time, since #$D_{BOTTOM}$ and #$D_{RIGHT}$ are not updated yet, the same processing as that executed when a non-standard paper form is determined in step (1) can be performed. Thus, it is checked if it is designated that the paper size is to be displayed in mm (11). If YES in step (11), #$D_{BOTTOM}$ and #$D_{RIGHT}$ are converted into values in mm by dividing them with the resolution, and multiplying the quotients with 25.4 mm, and the converted value s are displayed in mm, as shown in FIG. 14C (12), thus ending processing.

On the other hand, if it is determined in step (11) that a display in mm is not designated, it is checked if a display in inches is designated (13). If YES in step (13), #$D_{BOTTOM}$ and #$D_{RIGHT}$ are converted into values in inches by dividing them with the resolution, and the converted values are displayed, as shown in FIG. 14B (14), thus ending processing. However, if NO in step (13), #$D_{BOTTOM}$ and #$D_{RIGHT}$ are displayed in the number of dots, as shown in FIG. 14A (15), thus ending processing.

In this manner, the display confirmation processing ends, and the CPU 4 performs a page layout operation based on final #$D_{BOTTOM}$ and #$D_{RIGHT}$.

In this embodiment, the standard paper form information table and margin values used for correcting detection errors are held in advance in the ROM 3. Alternatively, such information may be stored in the RAM 5, and may be set by a user using a designation means on the operation panel 13 or a control command. In this case, the CPU 4 performs information setting processing on the RAM 5.

The paper size detection processing adopts a method of moving the sensor. Alternatively, when a sensor for detecting the entire paper feed path of the print apparatus is used instead, the number of movable portions decreases, and reliability can be improved.

In the above embodiment, a temporarily fed paper sheet is directly exhausted. Alternatively, when the paper feed mechanism is designed to allow a reverse paper feed operation, a paper sheet used in paper size detection can be fed again. With this arrangement, a paper sheet can be re-fed without requiring a manual operation of a user.

When the standard paper form information table is designed to allow user registration, it can be used for paper sizes other than standard paper forms. At this time, user registered form information is searched after the end of this processing.

[Fifth Embodiment]

FIGS. 16A to 16H are views for explaining layout determination processing in a print apparatus according to the fifth embodiment of the present invention. How to lay out print data based on the placed direction of a paper sheet and a designated orientation will be explained below.

FIG. 16A shows a portrait orientation, and FIG. 16B shows a landscape orientation. Note that the logic numbers of dots at paper bottom and right edges ($\#D_{BOTTOM}(L)$ and $\#D_{RIGHT}(L)$) in FIGS. 16A and 16B mean the bottom and right edges on a logical coordinate system used upon execution of page layout by the CPU 4. This coordinate system is used for performing layout processing irrespective of the direction of a paper sheet and the orientation (this coordinate system will be referred to as a "logic coordinate system" hereinafter). The portrait and landscape orientations on the logic coordinate system are discriminated from each other by replacing $\#D_{BOTTOM}(L)$ and $\#D_{RIGHT}(L)$ each other depending on whether a paper sheet is used in the vertical or horizontal direction. In order to express this logic coordinate system on an actual paper sheet, as shown in FIGS. 16C to 16F, various kinds of rotation print processing are required depending on the direction of a paper sheet and the orientation. If such processing is not performed, the logic coordinate system indicated by a broken line does not coincide with the direction of a paper sheet, as shown in FIGS. 16G and 16H, and an intended print result cannot be obtained. The following rotation processing is performed depending on the portrait or landscape direction of a paper sheet.

As the basic processing, when the rotation angle in a portrait mode is set to be "0", it can be considered that print data in a landscape mode is rotated counterclockwise through +90° (see FIGS. 16C and 16D). As for the portrait and landscape directions of a paper sheet, upon comparison between the portrait and landscape directions in the portrait mode shown in FIGS. 16C and 16E, it can be considered that print data is rotated through the rotation angle of 0° in the case of the portrait direction, and is rotated through −90° (270°) in the case of the landscape direction.

Similarly, in the landscape mode, upon comparison between FIGS. 16D and 16F, it can be considered that print data in FIG. 16F is rotated through −90° (270°) with reference to FIG. 16D. Therefore, the reference rotation angle of print data is 0° when a paper sheet is placed in the portrait direction, and is −90° (270°) when a paper sheet is placed in the landscape direction.

When the portrait mode is designated as an orientation mode, +0° is added to the rotation angle, and when the landscape mode is designated, +90° is added to the rotation angle.

On the other hand, a method of determining $\#D_{BOTTOM}(L)$ and $\#D_{RIGHT}(L)$ of the logic coordinate system which requires page layout is simple. That is, in the portrait mode, the long side of a paper sheet is defined as a logic paper bottom edge, and the short side of the paper sheet is defined as a logic paper right edge. In the landscape mode, one short side of a paper sheet is defined as a logic paper bottom edge, and one long side of the paper sheet is defined as a logic paper right edge. Actual determination processing of the rotation angle, the logic paper bottom edge, and the logic paper right edge will be described below with reference to the flow chart in FIG. 17.

Figure 17:
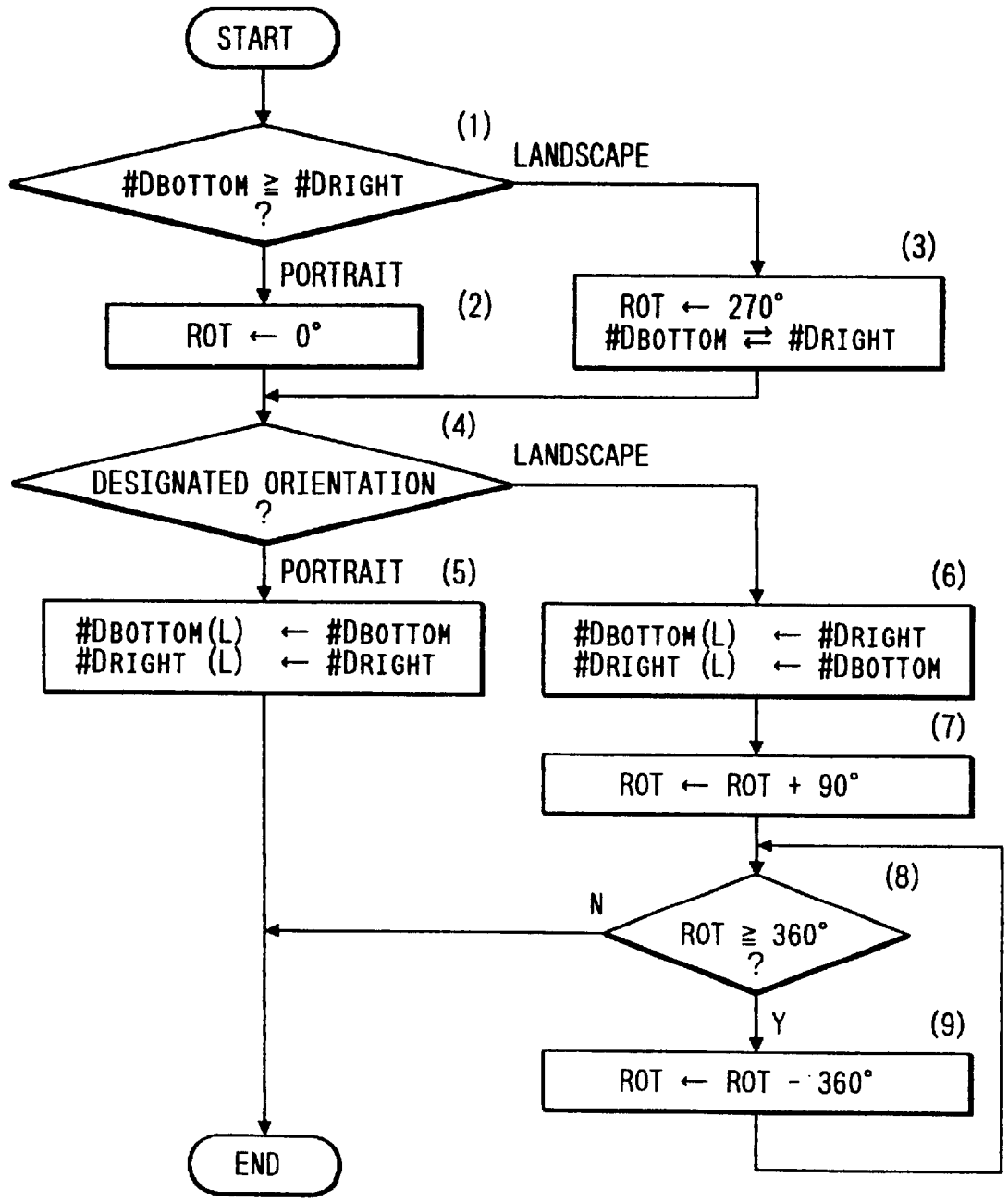
FIG. 17 is a flow chart showing an example of a page layout determination processing sequence in the print apparatus according to the fifth embodiment of the present invention.

FIG. 17 is a flow chart showing an example of a page layout determination processing in the print apparatus according to the fifth embodiment of the present invention. Note that (1) to (9) represent steps. Also, $\#D_{BOTTOM}$ and $\#D_{RIGHT}$ in FIG. 17 respectively correspond to the number of dots at paper bottom edge and the number of dots at paper right edge as results of the above-mentioned paper size detection.

$\#D_{BOTTOM}$ and $\#D_{RIGHT}$ are compared with each other to check if a paper sheet is placed in the portrait or landscape direction (1). If it is determined in step (1) that the paper sheet is placed in the portrait direction, since $\#D_{BOTTOM} > \#D_{RIGHT}$, the rotation angle (ROT) is initialized to "0" (2).

On the other hand, if it is determined in step (1) that the paper sheet is placed in the landscape direction, since $\#D_{BOTTOM} < \#D_{RIGHT}$, the rotation angle is initialized to 270° (−90°), and the contents of $\#D_{BOTTOM}$ and $\#D_{RIGHT}$ are replaced with each other, so that $\#D_{BOTTOM}$ represents the long side (3). Thus, the following processing can be commonly performed.

It is then checked if the designated orientation mode is the portrait or landscape mode (4). If it is determined in step (4) that the designated orientation mode is the portrait mode, $\#D_{BOTTOM}$ as the size of the long side of the paper sheet is set in $\#D_{BOTTOM}(L)$, and $\#D_{RIGHT}$ as the size of the short side of the paper sheet is set in $\#D_{RIGHT}(L)$ (5), thus ending processing. In this case, rotation angle correction is not necessary.

If it is determined in step (4) that the designated orientation mode is the landscape mode, $\#D_{RIGHT}$ as the size of the short side of the paper sheet is s et in $\#D_{BOTTOM}(L)$, and $\#D_{BOTTOM}$ as the size of the long side of the paper sheet is set in $\#D_{RIGHT}(L)$ (6). In the landscape mode, since print data must be rotated through +90°, "90" is added to the rotation angle, and rotation processing is performed (7). It is then checked if the rotation angle is equal to or larger than 360° (8). If NO in step (8), the processing ends; otherwise, "360" is subtracted from the rotation angle to correct the rotation angle to be a value smaller than 360° (9). Thereafter, the flow returns to step (8).

The rotation angle, $\#D_{BOTTOM}(L)$, and $\#D_{BOTTOM}(L)$ are obtained, as described above.

In this manner, in a fifth print apparatus having the same arrangement as the print apparatus shown in FIG. 11, a size detection means (the paper front-rear sensor 7 and the paper left-right sensor 10) detects the cut sheet size by detecting the front and rear edges and the right and left edges of a cut sheet fed from a paper feed means, and a correction means (the CPU 4) corrects the detected cut sheet size on the basis of a plurality of pieces of pre-stored correction information. A rotation means (the CPU 4) rotates print data to be output from an output means (the output device 6) by comparing the direction of the cut sheet size determined by a determination means (the CPU 4) and a page layout direction designated by a designation means (the operation panel 13), and a control means (the CPU 4) controls a page layout of the rotated print data on the cut sheet in accordance with the cut sheet size corrected by the correction means. For this reason, even when the page layout direction of a cut sheet designated by a user is different from the placed direction of the cut sheet, a print output matching the page layout direction designated by the user can be obtained.

The CPU 4 performs page layout processing and rotation print processing on the basis of such information. Since correction processing or the like upon development from the logic coordinate system to an actual memory is achieved by known rotation processing, a detailed description thereof will be omitted.

[Sixth Embodiment]

A transfer processing operation of detected paper size information to an external apparatus in a print apparatus according to the sixth embodiment of the present invention will be described below with reference to FIG. 1.

In response to a control command from the external apparatus 1, the detected paper size is sent back to the external apparatus 1 via a bidirectional interface of the input device 2. In this case, when the paper size information is obtained, as described above, the detection result may be arbitrarily sent back to the external apparatus 1. However, with this processing, since the external apparatus 1 must always monitor it, this results in waste of time. Thus, in the control of this embodiment, in order to achieve synchronization with the external apparatus 1, a control command is used to define a sendback format, so that the external apparatus 1 can easily obtain information. Examples of control commands used in this embodiment will be described below.

Paper Size Sendback Command: format [cs] ?<unit>n for cs="9Bh"

In this control command example, when <unit> is designated, the type of sendback data can be determined in units of the resolution of the print apparatus, mm, inches, and the like. With this designation, the print apparatus converts #$D_{RIGHT}$ and #$D_{BOTTOM}$ to numerical values in designated units, then converts the converted values into a character string, and sends back the character string to the external apparatus 1 in the following format.

Sendback Data Example (upon dot designation): format [dc] 5100 ; 3501 [st] [cr] [1f]

Sendback Data Example (upon 1/10-mm designation): format [dc] 3598 ; 2470 [st] [cr] [1f]

Sendback Data Example (upon 1/100-inch designation): format [dc] 1416; 973 [st] [cr] [1f]

for [dc]="90h", [st]="9Ch", [cr]="0Dh", and [1f]="0h".

The paper size information sendback processing based on the control command then transits to paper size sendback command interpretation for interpreting the above-mentioned paper size sendback command by conventional commend interpretation, and <unit> information is obtained first. When the designated unit is a 1/10-mm unit, a value obtained by multiplying #$D_{BOTTOM}$ with "10" and "25.4", and by dividing the product with the resolution is set in the sendback number of dots at paper bottom edge, and a value obtained by multiplying #$D_{RIGHT}$ with "10" and "25.4", and by dividing the product with the resolution is set in the sendback number of dots at paper right edge.

On the other hand, when the designated unit is a 1/100-inch unit, a value obtained by multiplying #$D_{BOTTOM}$ with "100", and by dividing the product with the resolution is set in the sendback number of dots at paper bottom edge, and a value obtained by multiplying #$D_{RIGHT}$ with "100", and by dividing the product with the resolution is set in the sendback number of dots at paper right edge.

When the designated unit is a dot unit, #$D_{BOTTOM}$ is directly set in the sendback number of dots at paper bottom edge, and #$D_{RIGHT}$ is directly set in the sendback number of dots at paper right edge.

The sendback numbers of dots at paper bottom and right edges are respectively converted into character strings, and the character strings are sent to the external apparatus 1 by the transmission processing of the bidirectional interface of the input device 2 together with a header ([dc]), a separator (;), and termination codes ([st] [cr] [1f]) based on the sendback data format, as described above.

In a sixth print apparatus with the same arrangement as the print apparatus shown in FIG. 1, a size detection means (the paper front-rear sensor 7 and the paper left-right sensor 10) detects the cut sheet size by detecting the front and rear edges and the right and left edges of a cut sheet fed from a paper feed means, and a correction means (the CPU 4) corrects the detected cut sheet size on the basis of a plurality of pre-stored correction information. A transfer means (by means of the bidirectional interface of the input device 2) transfers the corrected cut sheet size information to the external apparatus 1. For this reason, a program of the external apparatus 1 recognizes a page format corresponding to a cut sheet of the print apparatus, and the size of the fed cut sheet can be selected in addition to paper sizes registered in the program.

Note that the paper size sendback command used in the above embodiment is used for sending back paper size information detected in advance. When the apparatus comprises a paper feed mechanism which can re-feed a paper sheet, the application can include a paper size detection request function. With this function, when an application program issues the above-mentioned paper size sendback command, the print apparatus temporarily feeds a paper sheet, detects the size of the paper sheet currently set on a tray, and sends back the detection result. Thereafter, the paper sheet can be fed in the reverse direction to allow a re-feed operation.

The arrangement of an ink jet printer to which the print apparatus of the present invention can be applied will be described below with reference to FIG. 18. Note that this print apparatus comprises the control arrangement shown in FIG. 1.

Figure 18:
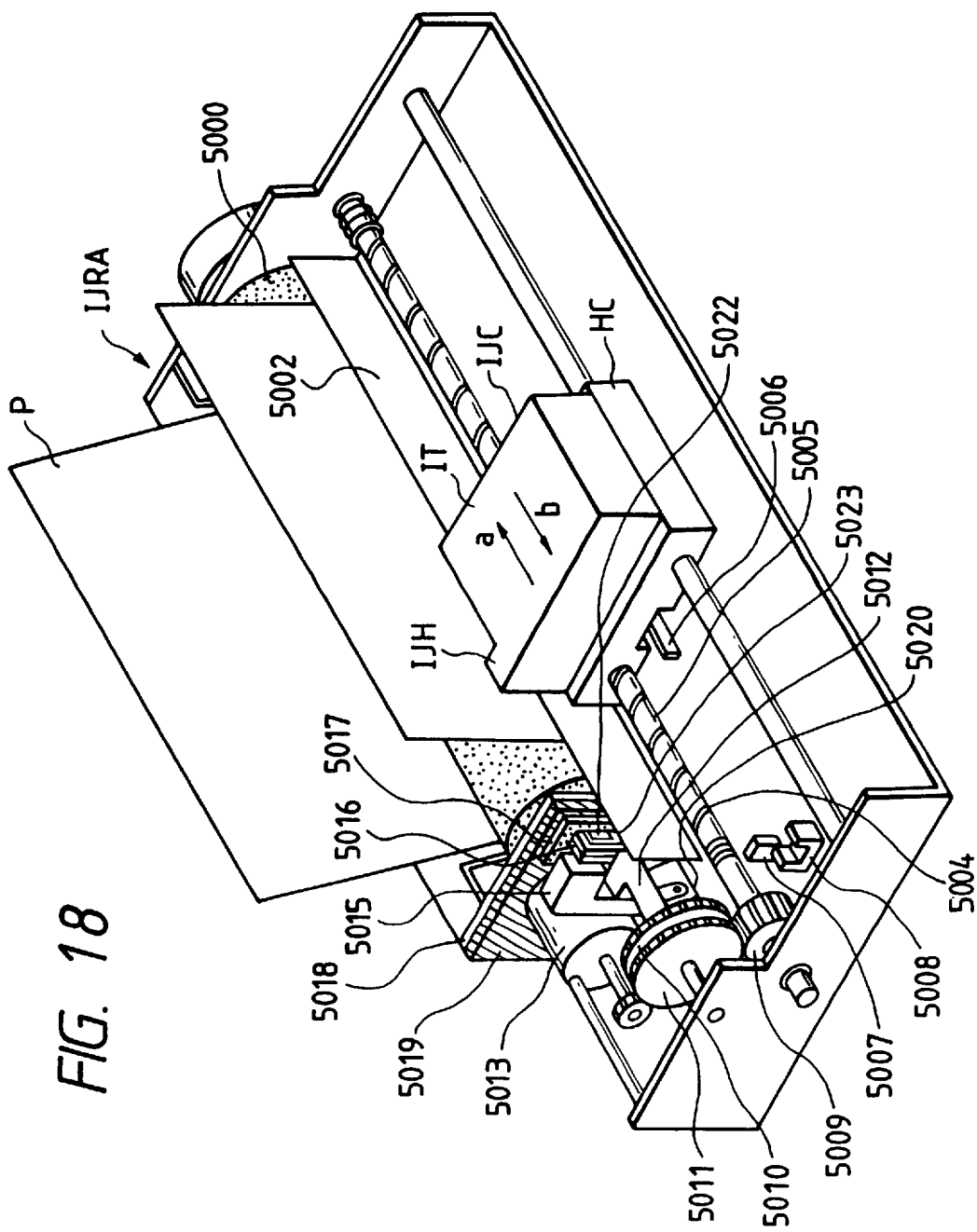
FIG. 18 is a perspective view showing the outer appearance of a print apparatus to which the present invention can be applied.

FIG. 18 is a perspective view showing the outer appearance of a print apparatus to which the present invention can be applied, and for example, shows an ink jet printer (IJRA).

Referring to FIG. 18, a carriage HC is engaged with a spiral groove 5004 of a lead screw 5005, which is rotated via driving force transmission gears 5011, 5010, and 5009 in synchronism with the forward/reverse rotation of a driving motor 5013. The carriage HC has a pin (not shown), and is reciprocally moved in the directions of arrows a and b in FIG. 18. An ink jet cartridge IJC is mounted on the carriage HC. A paper pressing plate 5002 presses a paper sheet against a platen 5000 across the carriage moving direction. Photocouplers 5007 and 5008 serve as home position detection means for detecting the presence of a lever 5006 of the carriage in a corresponding area, and switching, e.g., the rotation direction of the motor 5013. A cap member 5022 for capping the entire surface of a recording head is supported by a member 5016, and a suction means 5015 for drawing the interior of a cap by suction performs suction recovery of the recording head via an intra-cap opening 5023. A cleaning blade 5017 is supported by a member 5019 to be movable in the back-and-forth direction. A main body support plate 5018 supports the above-mentioned members 5017 and 5019. A lever 5012 is used for starting a suction process of the suction recovery, and is moved upon movement of a cam 5020 engaged with the carriage. The movement control of the lever 5012 is achieved based on the driving force from the driving motor via a known transmission means such as (clutch switching).

These capping, cleaning, and suction recovery processes are designed, so that desired processing is performed at the corresponding position upon operation of the lead screw 5005 when the carriage reaches the home position area. Note that these processes need only be designed, so that desired operations are performed at known timings.

As described above, according to one embodiment of the present invention, a size detection means detects the cut sheet size by detecting the front and rear edges and the right and left edges of a cut sheet fed from a paper feed means, a correction means corrects the detected cut sheet size on the basis of a plurality of pieces of pre-stored correction information, and a control means controls the page layout on the cut sheet by an output means in correspondence with the corrected cut sheet size. For this reason, even when the size detected by the size detection means includes an error, information laid out by a user based on a standard paper form can be reliably page-formatted on a cut sheet to be fed.

According to another embodiment of the present invention, since the correction means corrects the cut sheet size detected by the size detection means on the basis of pre-stored error correction information depending on the size detection means and correction information for a standard paper size, even when the size detected by the size detection means includes an error, information laid out by a user based on a standard paper form can be reliably page-formatted on a cut sheet to be fed.

According to still another embodiment of the present invention, the size detection means detects the cut sheet size by detecting the front and rear edges and the right and left edges of a cut sheet fed from the paper feed means, the correction means corrects the detected cut sheet size on the basis of cut sheet size data stored in a registered form information storage means, and the control means controls the page layout on the cut sheet by an output means in correspondence with the corrected cut sheet size. For this reason, even when a cut sheet having a size approximate to a standard paper size is fed, information can be reliably page-formatted on a cut sheet having a registered size used by a user.

According to still another embodiment of the present invention, the correction means corrects the cut sheet size detected by the size detection means to a standard paper size on the basis of pre-stored error correction information depending on the size detection means and correction information for the standard paper size, and the corrected paper size is displayed on a display means. When the displayed standard paper size is invalidated, and a cut sheet size obtained by correcting the cut sheet size detected by the size detection means based on the pre-stored error correction information depending on the size detection means is validated, the control means controls the page layout on the cut sheet by the output means in correspondence with the cut sheet size corrected by the correction means or the standard paper size. For this reason, a user can recognize that a cut sheet having a size approximate to the cut sheet size detected by the detection means is fed, and its size is corrected to the standard paper size, and can select the standard paper size or the cut sheet size.

According to still another embodiment of the present invention, the size detection means detects the cut sheet size by detecting the front and rear edges and the right and left edges of a cut sheet fed by the paper feed means, and the correction means corrects the detected cut sheet size on the basis of a plurality of pieces of pre-stored correction information. A determination means compares the direction of the cut sheet size, and a page layout direction designated by a designation means, and a rotation means rotates print data to be output from the output means. The control means then controls the page layout of the rotated print data on the cut sheet in correspondence with the corrected cut sheet size. For this reason, even when the page layout direction of the cut sheet designated by a user is different from the placed direction of the cut sheet, a print output matching the page layout direction designated by the user can be obtained.

According to still another embodiment of the present invention, the size detection means detects the cut sheet size by detecting the front and rear edges and the right and left edges of a cut sheet fed by the paper feed means, the correction means corrects the detected cut sheet size on the basis of a plurality of pieces of pre-stored correction information, and a transfer means converts the corrected cut size information to control information for an external apparatus and transfers the converted control information. For this reason, a program of the external apparatus recognizes a page format corresponding to a cut sheet of the print apparatus, and the size of the cut sheet to be fed can be selected in addition to paper sizes registered in the program.

Therefore, a page layout optimal to the size of a cut sheet to be fed can be realized by setting a cut sheet at the paper feed position independently of whether a standard paper sheet is fed or a cut sheet having a size specified by a user is fed.

What is claimed is:

1. An output control apparatus comprising:
   paper fed means for feeding a recording paper;
   paper width detection means for detecting a width of the recording paper fed by said paper feed means;
   paper length detection means for detecting a length of the recording paper by detecting front and rear edges of the recording paper during feeding of the recording paper by said paper feed means; and
   correction means for correcting the paper width detected by said paper width detection means and the paper length detected by said paper length detection means on the basis of a plurality of pieces of pre-stored correction information to determine a correct size of the recording paper.

2. An output control apparatus comprising:
   registered form information storage means for storing externally input size data of a recording paper having a desired size;
   paper feed means for feeding a recording paper;
   paper width detection means for detecting a width of the recording paper fed by said paper feed means;
   paper length detection means for detecting a length of the recording paper fed by said paper feed means by detecting front and rear edges of the recording paper during feeding of the recording paper by said paper feed means;
   correction means for correcting the paper width detected by said paper width detection means and the paper length detected by said paper length detection means on the basis of the size data stored in said registered form information storage means to determine a correct size of the recording paper; and
   control means for controlling a page layout on the recording paper in correspondence with the correct paper size determined by said correction means.

3. An output control apparatus comprising:
   paper feed means for feeding a recording paper;
   paper width detection means for detecting a width of the recording paper fed by said paper feed means;

paper length detection means for detecting a length of the recording paper by detecting front and rear edges of the recording paper during feeding of the recording paper by said paper feed means;

correction means for correcting the paper width detected by said paper width detection means and the paper length detected by said paper length detection means to a standard size on the basis of pre-stored error correction information depending on said paper width detection means, said paper length detection means, and correction information for the standard size;

display means for displaying the standard size corrected by said correction means;

standard size invalidating means for invalidating the standard size displayed on said display means, and validating a size obtained by correcting the paper width detected by said paper width detection means and the paper length detected by said paper length detection means on the basis of the pre-stored error correction information depending on said paper width detection means and said paper length detection means; and control means for controlling a page layout on the recording paper in correspondence with the size corrected by said correction means or the standard size.

4. An output control apparatus comprising:

page direction designation means for designating a page layout direction to be one of portrait and landscape directions;

paper feed means for feeding a recording paper;

paper width detection means for detecting a width of the recording paper fed by said paper feed means;

paper length detection means for detecting a length of the recording paper by detecting front and rear edges of the recording paper during feeding of the recording paper by said paper feed means;

determination means for determining one of portrait and landscape directions of the paper width detected by said paper width detection means and the paper length detected by said paper length detection means;

correction means for correcting the paper width detected by said paper width detection means and the paper length detected by said paper length detection means on the basis of a plurality of pieces of pre-stored correction information;

rotation means for comparing the one direction determined by said determination means, and a page layout direction designated state designated by said designation means, and rotating print data to be output; and control means for controlling a page layout of the print data rotated by said rotation means on the recording paper in correspondence with the paper width and paper length corrected by said correction means.

5. An output control apparatus comprising:

paper feed means for feeding a recording paper;

paper width detection means for detecting a width of the recording paper fed by said paper feed means;

paper length detection means for detecting a length of the recording paper by detecting front and rear edges of the recording paper during feeding of the recording paper by said paper feed means;

correction means for correcting the paper width detected by said paper width detection means and the paper length detected by said paper length detection means on the basis of a plurality of pieces of pre-stored correction information to determine correct size information of the recording paper; and transfer means for converting the size information determined by said correction means to control information for an external apparatus, and transferring the converted control information to the external apparatus.

6. An output control method comprising the steps of:

feeding a recording paper;

detecting a width of the recording paper fed in the feeding step;

detecting a length of the recording paper by detecting front and rear edges of the recording paper during feeding of the recording paper in the paper feed step; and correcting the detected paper width and the detected paper length on the basis of a plurality of pieces of pre-stored correction information to determine a correct size of the recording paper.

7. An output control method comprising the steps of:

feeding a recording paper;

detecting a width of the recording paper fed in the feeding step;

storing externally input size data of recording paper having a predetermined size;

detecting a length of the fed recording paper by detecting front and rear edges of the recording paper during feeding of the recording paper in the paper feed step; and correcting the detected length and the detected width of the fed recording paper on the basis of the stored size data to determine a corrected paper size; and controlling a page layout on the recording paper in correspondence with the corrected size.

8. An output control method comprising the steps of:

feeding a recording paper;

detecting a width of the recording paper fed in the feeding step;

detecting a length of the fed recording paper by detecting front and rear edges of the recording medium paper during feeding of the recording paper in the paper feed step; and correcting the detected length and the detected width of the fed recording paper to a standard size on the basis of pre-stored error correction information and correction information for the standard size;

displaying the corrected standard size;

invalidating the displayed standard size, and validating a size obtained by correcting the detected paper width and the detected paper length on the basis of the pre-stored error correction information; and controlling a page layout on the recording paper in correspondence with the corrected size or the standard size.

9. An output control method comprising the steps of:

feeding a recording paper;

detecting a width of the recording paper fed in the feeding step;

detecting a length of the fed recording paper by detecting front and rear edges of the recording paper during feeding of the recording paper fed in the paper feed step; and determining one of portrait and landscape directions of the detected length and the detected width;

correcting the detected paper length and the detected paper width on the basis of a plurality of pieces of pre-stored correction information;

comparing the determined direction and designation information which designates a page layout direction, and rotating print data to be output in accordance with the comparison; and controlling a page layout of the rotated print data on the recording paper in correspondence with the corrected paper length and the corrected paper width.

10. An output control method comprising the steps of:

feeding a recording paper;

detecting a width of the recording paper fed in the feeding step;

detecting a length of the fed recording paper by detecting front and rear edges of the recording paper during feeding of the recording paper in the paper feed step; and correcting the detected length and the detected width on the basis of a plurality of pieces of pre-stored correction information; and converting corrected length and corrected width information to external apparatus control information, and transferring the converted control information to the external apparatus.

11. Apparatus according to claim 1, wherein said output control apparatus comprises a printer apparatus.

12. Apparatus according to claim 1, wherein said size detection means detects the size of a non-standard recording medium.

13. Apparatus according to claim 2, wherein said output control apparatus comprises a printer apparatus.

14. Apparatus according to claim 2, wherein said size detection means detects the size of a non-standard recording medium.

15. Apparatus according to claim 3, wherein said output control apparatus comprises a printer apparatus.

16. Apparatus according to claim 3, wherein said size detection means detects the size of a non-standard recording medium.

17. Apparatus according to claim 4, wherein said output control apparatus comprises a printer apparatus.

18. Apparatus according to claim 4, wherein said size detection means detects the size of a non-standard recording medium.

19. Apparatus according to claim 5, wherein said output control apparatus comprises a printer apparatus.

20. Apparatus according to claim 5, wherein said size detection means detects the size of a non-standard recording medium.

21. A method according to claim 6, wherein said output control method comprises a print method.

22. A method according to claim 6, wherein said step of detecting a size comprises the step of detecting a size of a non-standard recording medium.

23. A method according to claim 7, wherein said output control method comprises a print method.

24. A method according to claim 7, wherein said step of detecting a size comprises the step of detecting a size of a non-standard recording medium.

25. A method according to claim 8, wherein said output control method comprises a print method.

26. A method according to claim 8, wherein said step of detecting a size comprises the step of detecting a size of a non-standard recording medium.

27. A method according to claim 9, wherein said output control method comprises a print method.

28. A method according to claim 9, wherein said step of detecting a size comprises the step of detecting a size of a non-standard recording medium.

29. A method according to claim 10, wherein said output control method comprises a print method.

30. A method according to claim 10, wherein said step of detecting a size comprises the step of detecting a size of a non-standard recording medium.

31. An apparatus according to claim 1, further comprising control means for controlling a page layout on the recording paper in correspondence with the correct paper size determined by said correction means.

32. A method according to claim 6, further comprising the step of controlling a page layout on the recording paper in correspondence with the correct paper size determined in the correcting step.

* * * * *

UNITED STATES PATENT AND TRADEMARK OFFICE
CERTIFICATE OF CORRECTION

PATENT NO. : 5,828,818

DATED : October 27, 1998

INVENTOR(S) : KATSUHIKO ANZAI

It is certified that error appears in the above-identified patent and that said Letters Patent is hereby corrected as shown below:

COLUMN 1,
Line 29, "matches' should read --match--.

COLUMN 11,
Line 61, "TBL[IDX]H" should read --TBL[IDX]$_H$--.

COLUMN 13,
Line 13, "have" should read --to have--.

COLUMN 18,
Line 39, "value s" should read --values--.

COLUMN 20,
Line 36, "s et" should read --set--.

COLUMN 21,
Line 1, "perform s" should read --performs--; and
Line 44, "[1f]="0h"." should read --[1f]="0Ah".--.

UNITED STATES PATENT AND TRADEMARK OFFICE
CERTIFICATE OF CORRECTION

PATENT NO. : 5,828,818

DATED : October 27, 1998

INVENTOR(S) : KATSUHIKO ANZAI

It is certified that error appears in the above-identified patent and that said Letters Patent is hereby corrected as shown below:

<u>COLUMN 24</u>,
Line 28, "fed" should read --feed--.

Signed and Sealed this

Sixth Day of July, 1999

Attest:

Q. TODD DICKINSON

Attesting Officer

Acting Commissioner of Patents and Trademarks